US 8,566,731 B2

(12) United States Patent
Subramanian et al.

(10) Patent No.: US 8,566,731 B2
(45) Date of Patent: Oct. 22, 2013

(54) REQUIREMENT STATEMENT MANIPULATION SYSTEM

(75) Inventors: Venkatesh Subramanian, Bangalore (IN); Alex Kass, Palo Alto, CA (US); Kunal Verma, Sunnyvale, CA (US); Gary Titus, Bangalore (IN); Deepmala Gupta, Bangalore (IN); Santhosh Kumar Shivaram, Bangalore (IN)

(73) Assignee: Accenture Global Services Limited (IE)

( * ) Notice: Subject to any disclaimer, the term of this patent is extended or adjusted under 35 U.S.C. 154(b) by 643 days.

(21) Appl. No.: 12/830,700

(22) Filed: Jul. 6, 2010

(65) Prior Publication Data

US 2012/0011455 A1 Jan. 12, 2012

(51) Int. Cl.
*G06F 3/00* (2006.01)
*G06F 3/048* (2013.01)

(52) U.S. Cl.
USPC ............ 715/762; 715/764; 715/765; 715/772

(58) Field of Classification Search
USPC .................. 715/762, 764, 765, 772
See application file for complete search history.

(56) References Cited

U.S. PATENT DOCUMENTS

| | | | |
|---|---|---|---|
| 5,369,575 A | 11/1994 | Lamberti et al. | |
| 5,774,833 A | 6/1998 | Newman | |
| 5,995,920 A | 11/1999 | Carbonell et al. | |
| 6,139,201 A | 10/2000 | Carbonell et al. | |
| 6,167,370 A | 12/2000 | Tsourikov et al. | |
| 6,343,297 B1 | 1/2002 | D'Anjou et al. | |
| 6,510,425 B1 | 1/2003 | Okamoto et al. | |
| 6,681,383 B1 | 1/2004 | Pastor et al. | |
| 6,715,130 B1 | 3/2004 | Eiche et al. | |
| 6,886,115 B2 | 4/2005 | Kondoh et al. | |
| 7,111,076 B2 | 9/2006 | Abjanic et al. | |
| 7,146,422 B1 | 12/2006 | Marlatt et al. | |
| 7,337,102 B2 | 2/2008 | Mosterman | |
| 7,500,185 B2 | 3/2009 | Hu | |
| 7,536,711 B2 | 5/2009 | Miyashita et al. | |
| 7,593,891 B2 | 9/2009 | Kornegay et al. | |
| 7,647,349 B2 | 1/2010 | Hubert et al. | |
| 7,694,222 B2 | 4/2010 | Steen et al. | |
| 7,725,923 B2 | 5/2010 | Miyashita et al. | |
| 7,752,094 B2 | 7/2010 | Davidson et al. | |

(Continued)

FOREIGN PATENT DOCUMENTS

EP 1 672 547 A1 6/2006

OTHER PUBLICATIONS

Alani, H. et al., "Automatic Ontology-Based Knowledge Extraction from Web Documents," IEEE Intelligent Systems, 2003, pp. 14-21.

(Continued)

*Primary Examiner* — Weilun Lo
*Assistant Examiner* — Truc Chuong
(74) *Attorney, Agent, or Firm* — Brinks Hofer Gilson & Lione

(57) ABSTRACT

A requirement statement manipulation system is configured to create and edit requirement statements of various types. The requirement statement manipulation system may generate an interactive visual environment to receive input used in manipulating a requirement statement through creation or editing. The interactive visual environment may include specific requirement-type interfaces allowing requirement statements of a specific type to be manipulated. The interactive visual environment may manipulate requirement statements based on textual input, as well as through text generation.

19 Claims, 18 Drawing Sheets

(56) References Cited

U.S. PATENT DOCUMENTS

| | | | |
|---|---|---|---|
| 7,769,570 B2 | 8/2010 | Mosterman | |
| 7,774,743 B1 | 8/2010 | Sanchez et al. | |
| 7,877,737 B2 | 1/2011 | Austin et al. | |
| 7,975,220 B2 | 7/2011 | Hattori | |
| 2002/0065857 A1 | 5/2002 | Michalewicz et al. | |
| 2002/0147763 A1 | 10/2002 | Lee et al. | |
| 2002/0165717 A1 | 11/2002 | Solmer et al. | |
| 2002/0184397 A1 | 12/2002 | Cooper | |
| 2003/0149692 A1 | 8/2003 | Mitchell | |
| 2003/0172135 A1 | 9/2003 | Bobick et al. | |
| 2003/0220853 A1 | 11/2003 | Back et al. | |
| 2004/0025110 A1 | 2/2004 | Hu | |
| 2004/0030540 A1 | 2/2004 | Ovil et al. | |
| 2004/0031019 A1* | 2/2004 | Lamanna et al. | 717/125 |
| 2004/0034651 A1 | 2/2004 | Gupta et al. | |
| 2004/0039734 A1 | 2/2004 | Judd et al. | |
| 2004/0083092 A1 | 4/2004 | Valles | |
| 2004/0153992 A1 | 8/2004 | Molina-Moreno et al. | |
| 2004/0215443 A1 | 10/2004 | Hatton | |
| 2004/0268319 A1* | 12/2004 | Tousignant | 717/131 |
| 2005/0108001 A1 | 5/2005 | Aarskog | |
| 2005/0216882 A1 | 9/2005 | Sundararajan et al. | |
| 2006/0041579 A1 | 2/2006 | Miyashita et al. | |
| 2006/0085451 A1 | 4/2006 | Pal et al. | |
| 2006/0085489 A1 | 4/2006 | Tomic et al. | |
| 2006/0190804 A1 | 8/2006 | Yang | |
| 2006/0265646 A1 | 11/2006 | Girolami Rose | |
| 2006/0282266 A1 | 12/2006 | Lopez-Barquilla et al. | |
| 2007/0143329 A1 | 6/2007 | Vigen | |
| 2007/0244859 A1 | 10/2007 | Trippe et al. | |
| 2007/0294230 A1 | 12/2007 | Sinel et al. | |
| 2008/0033897 A1 | 2/2008 | Lloyd | |
| 2009/0138793 A1 | 5/2009 | Verma et al. | |

OTHER PUBLICATIONS

Baral, C. et al., "Using AnsProlog with Link Grammar and WordNet for QA with deep reasoning," 9th International Conference on Information Technology, IEEE Computer Society, 2006, 4 pages.

Biswal, B. N. et al., "A Novel Approach for Scenario-Based Test Case Generation," International Conference on Technology, IEEE Computer Society, 2008, pp. 244-247.

Cunning, S. J. et al., "Test Scenario Generation from a Structured Requirements Specification," IEEE Conference and Workshop on Engineering of Computer-Based Systems, 7 pages, Mar. 1, 2012.

Dahab, M. Y. et al., "TextOntoEx: Automatic ontology construction from natural English text," Expert Systems with Applications, vol. 34, 2008, pp. 1474-1480.

Daneva, M., "ERP Requirements Engineering Practice: Lessons Learned," IEEE Software, 2004. pp. 26-33.

Daneva, M., "Establishing Reuse Measurement Practices in SAP Requirements Engineering," IEEE, 2000, 10 pages.

de Marneffe, M-C. et al., "Generating Typed Dependency Parses from Phrase Structure Parses," LRCE, 6 pages, Mar. 1, 2012.

de Marneffe, M-C. et al., "Stanford typed dependencies manual," Sep. 2008 (Revised for Stanford Parser v. 1.6.2, 2010), 20 pages.

Deeptimahanti, D. K. et al., "An Automated Tool for Generating UML Models from Natural Language Requirements," IEEE/ACM International Conference on Automated Software Engineering, IEEE Computer Society, 2009, pp. 680-682.

Deeptimahanti, D. K. et al., "Semi-automatic Generation of UML Models from Natural Language Requirements," India Software Engineering Conference, 2011, pp. 165-174.

Dickinson, I., "Jena Ontology API," 2009, printed from the internet at <http://jena.sourceforge.net/ontology/> on Feb. 21, 2012, 29 pages.

Egyed, A., "Scalable Consistency Checking between Diagrams—The ViewIntegra Approach," Proceedings of the 16th IEEE International Conference on Automated Software Engineering, USA: San Diego, 2001, 4 pages.

Fabbrini, F. et al., "The Linguistic Approach to the Natural Language Requirements Quality: Benefit of the use of an Automatic Tool," 9 pages, Mar. 1, 2012.

Gervasi, V. et al., "Reasoning About Inconsistencies in Natural Lanuguage Requirements," ACM Transactions on Software Engineering and Methodology, vol. 14, No. 3, 2005, pp. 277-330.

Gnesi, S. et al., "An Automatic Tool for the Analysis of Natural Language Requirements," Comput. Systt. Sci. Eng., 13 pages, Mar. 1, 2012.

Hayes, J. H. et al., "Advancing Candidate Link Generation for Requirements Tracing: The Study of Methods," IEEE Transactions on Software Engineering, vol. 32, No. 1, 2006, pp. 4-19.

"IEEE Standard for Software and System Test Documentation," IEEE Standard 829-2008, IEEE Computer Society, 2008, 132 pages.

Ilieva, M. G. et al., "Automatic Transition of Natural Language Software Requirements Specification into Formal Presentation," Natural Language and Processing Information Systems, Lecture Notes in Computer Science, vol. 3513, copyright Springer-Verlag, 2005, pp. 392-397.

Jirapanthong, W. et al., "XTraQue: traceability for product line systems," Software and Systems Modeling, vol. 8, 2009, pp. 117-144.

Kof, L., et al., "Faster from Requirements Documents to System Models: Interactive Semi-Automatic Translation with a tool that is learning on the fly," Requirements Engineering Efficiency Workshop, 17th International Working Conference on Requirements Engineering: Foundation for Software Quality, 2011, 41 pages.

Kosindrdecha, N. et al., "A Test Generation Method Based on State Diagram," Journal of Theoretical and Applied Information Technology, 2010, pp. 28-44.

Li, L. et al., "A Software Framework for Matchmaking Based on Semantic Web Technology," in WWW, 2003, pp. 331-339.

Li, Y. et al., "Sentence Similarity Based on Semantic Nets and Corpus Statistics," IEEE Transactions on Knowledge and Data Engineering, vol. 18, No. 8, 2006, pp. 1138-1150.

Lin, D., "Dependency-Based Evaluation of MINIPAR," in Workshop on the Evaluation of Parsing Systems, Ch. 18, pp. 317-329, Mar. 1, 2012.

Lin, D., "An Information-Theoretic Definition of Similarity," 9 pages, Mar. 1, 2012.

Litvak, B. et al., "Behavioral Consistency Validation of UML Diagrams," Proceedings of the First International Conference on Software Engineering and Formal Methods, IEEE Computer Society, 2003, 8 pages.

Luisa, M. et al., "Market Research for Requirements Analysis Using Linguistic Tools," Requirements Engineering, vol. 9, No. 1, 26 pages, Mar. 1, 2012.

Marcus, M. P. et al., "Building a Large Annotated Corpus of English: the Penn Treebank," Computational Linguistics, 1993, 22 pages.

Mihalcea, R. et al., "Corpus-based and Knowledge-based Measures of Text Semantic Similarity," in American Associate for Artificial Intelligence, 2006, 6 pages.

Miller, G. A., "Wordnet: A Lexical Database for English," Communications of the ACM, vol. 38, No. 11, 1995, pp. 39-41.

Nanduri, S. et al., "Requirements Validation via Automated Natural Language Parsing," Proceedings of the 28th Annual Hawaii International Conference on System Sciences, IEEE, 1995, pp. 362-368.

Nebut, C. et al., "Automatic Test Generation: A Use Case Driven Approach," IEEE Transactions on Software Engineering, vol. 32, No. 3, 2006, pp. 140-155.

Neill, C. J. et al., "Requirements Engineering: The State of the Practice," IEEE Software, IEEE Computer Society, vol. 20, No. 6, 2003, pp. 40-45.

Offutt, J. et al., "Generating Tests from UML Specifications," U.S. National Science Foundation under grant CCR-98-04111 and Rockwell Collins, Inc., 14 pages, Mar. 1, 2012.

Paolucci, M. et al., "Semantic Matching of Web Services Capabilities," 15 pages, Mar. 1, 2012.

Phyu, A. L. L. et al., "Domain Adaptive Information Extraction Using Link Grammar and WordNet," Fifth International Conference on Creating, Connecting, and Collaborating through Computing, IEEE Computer Society, 2007, 7 pages.

Porter, M. F., "An Algorithm for Suffix Stripping," Program, vol. 14, No. 3, 1980, pp. 130-137.

Pyysalo, S. et al., "Analysis of Link Grammar on Biomedical Dependency Corpus Targeted at Protein-Protein Interactions," pp. 15-21, Mar. 1, 2012.

(56) References Cited

OTHER PUBLICATIONS

RosettaNet website, 2012, printed from the internet at <http://www.rosettanet.org/> on Feb. 21, 2012, 2 pages.
Ryan, K., "The Role of Natural Language in Requirements Engineering," IEEE, 1992, pp. 240-242.
Sharma, V. S. et al., "Extracting High-Level Functional Design from Software Requirements," 16th Asia-Pacific Software Engineering Conference, IEEE Computer Society, 2009, pp. 35-42.
Sinha, A. et al., "Text2Test: Automated Inspection of Natural Language Use Cases," 2010 Third International Conference on Software Testing, Verification and Validation, IEEE Computer Society, 2010, pp. 155-162.
Sleator, D. D. et al., "Parsing English with a Link Grammar," CMU Technical Report, 1991, 93 pages.
Sleator, D. D. et al., "Parsing English with a Link Grammar," in Third International Workshop on Parsing Technologies, 1993, 14 pages.
Sleator, D., "Link Grammar License," 2005, printed from the internet at <http://www.link.cs.cmu.edu/link/license.html> on Feb. 21, 2012, 1 page.
Sleator, D., "Summary of Link Types," 1998, 7 pages.
Sneed, H. M., "Testing Against Natural Language Requirements," Seventh International Conference on Quality Software, IEEE Computer Society, 2007, 8 pages.
Soffer, P. et al., "Modelling Off-the-Shelf Information Systems Requirements: An Ontological Approach," Requirements Engineering, vol. 6, 2001, pp. 183-199.
"The Phrase Parser," printed from the internet at <http://www.abisource.com/projects/link-grammar/dict/ph-explanation.html> on Feb. 21, 2012, 8 pages.
"The Stanford Parser: A statistical parser," The Stanford Natural Language Processing Group, printed from the Internet at <http://nlp.stanford.edu/software/lex-parser.shtml> on Feb. 21, 2012, 6 pages.
WebSphere Industry Content Packs accelerate Insurance, Banking, Telecom, Healthcare & Industrial PLM WebSphere BPM solutions, IBM Software, printed from the internet at <http://www-142.ibm.com/software/products/gb/en/inducontpack/> on Feb. 21, 2012, 5 pages.
Zachos, K. et al., "Inventing Requirements from Software: An Empirical Investigation with Web Services," in 16th IEEE International Requirements Engineering Conference, IEEE Computer Society, 2008, pp. 145-154.
Zamin, N., "Information Extraction using Link Grammar," 2009 World Congress on Computer Science and Information Engineering, IEEE Computer Society, 2008, pp. 149-153.
Basili, V. R. et al., "Comparing the Effectiveness of Software Testing Strategies," IEEE Transactions on Software Engineering, vol. SE-13, No. 12, 1987, pp. 1278-1296.
Luo, L., "Software Testing Techniques: Technology Maturation and Research Strategy," Class Report for 17-939A, Institute for Software Research International, Carnegie Mellon University, 20 pages, Mar. 14, 2012.
Sutton, S. M. et al., "Text2Test: Automated Inspection of Natural Language Use Cases," IBM Search Report, Computer Science, 2009, 11 pages.
Boddu, R. et al., "RETNA: From Requirements to Testing in a Natural Way," Proceedings of the 12th IEEE International Requirements Engineering Conference, 2004, 10 pages.
Baader, F. et al., "Description Logics," Reasoning Web. Semantic Technologies for Information Systems, 2009, 40 pages.
Brandozzi, M. et al., "Transforming Goal Oriented Requirement Specifications into Architecture Prescriptions," Proceedings STRAW '01, ICSE 2001, 8 pages.
Cunning, S. J. et al., "Test Scenario Generation from a Structured Requirements Specification," IEEE Conference and Workshop on Engineering of Computer-Based Systems, ecbs, 1999, 7 pages.
de Marneffe, M-C. et al., "Generating Typed Dependency Parses from Phrase Structure Parses," LRCE, 2006, 6 pages.
Fabbrini, F. et al., "The Linguistic Approach to the Natural Language Requirements Quality: Benefit of the use of an Automatic Tool,"
SEW '01 Proceedings of the 26th Annual NASA Goddard Software Engineering Workshop, 2001, 9 pages.
Fantechi, A. et al., "A Content Analysis Technique for Inconsistency Detection in Software Requirements Documents," WER, 2005, pp. 245-256.
Gnesi, S. et al., "An Automatic Tool for the Analysis of Natural Language Requirements," Comput. Syst. Sci. Eng., 2005, 13 pages.
Hall, J. G. et al., "Relating Software Requirements and Architectures using Problem Frames," Proceedings of the IEEE Joint International Conference on Requirements Engineering (RE '02), 2002, 8 pages.
Lin, D., "Dependency-Based Evaluation of Minipar," Text, Speech, and Language Technology 1, vol. 20, Treebanks, Part II, 2003, pp. 317-329.
Lin, D., "An Information-Theoretic Definition of Similarity," Proceedings of the 15th International Conference on Machine Learning 1, 1998, pp. 296-304.
Luisa, M. et al., "Market Research for Requirements Analysis Using Linguistic Tools," Requirements Engineering, vol. 9, No. 1, 2002, 26 pages.
Luo, L., "Software Testing Techniques: Technology Maturation and Research Strategy," Class Report for 17-939A, Institute for Software Research International, Carnegie Mellon University, 2009, 20 pages.
Anandha Mala, G.S. et al., "Automatic Construction of Object-Oriented Design Models [UML Diagrams] from Natural Language Requirements Specification," PRICAI, 2006, pp. 1155-1159.
Anderson, T. et al., "On Formal Support for Industrial-Scale Requirements Analysis," Department of Computing Science, University of Newcastle upon Tyne, UK, pp. 426-451.
ANTLR, URL: printed from the internet at <http://www.antlr.org>, on May 18, 2010, 2 pages.
Apache OpenNLP, The Apache Software Foundation, 2010, printed from the internet at <http://incubator.apache.org.opennlp/index.html> on Aug. 22, 2011, 2 pages.
Appfuse, 2008, printed from the internet at <http://appfuse.org/display/APF/Home> on Aug. 16, 2011, 2 pages.
Baader, F. et al., "Description Logics," Theoretical Computer Science, TU Dresden, Germany, 40 pages.
Baader, F. et al., Chapter 3, Description Logics, Elsevier, 2007, 47 pages.
Basler, M. et al., "Introducing the Java Pet Store 2.0 Application," 2007, printed from the internet at <http://java.sun.com/jsp.utils/PrintPage.jsp?url=http%3A%2F%2Fjava.sun.com%2Fdevelo...> on Aug. 17, 2011, 10 pages.
Boehm, B. W., "Understanding and Controlling Software Costs," IEEE Transactions on Software Engineering, vol. 14, No. 10, 1988, pp. 1462-1477.
Boehm, B. et al., "Identifying Quality-Requirement Conflicts," IEEE Software, vol. 13, No. 2, IEEE Computer Society Press, Los Alamitos, 1996, pp. 25-35.
Borland Software Corporation, "Mitigating Risk with Effective Requirements Engineering," Apr. 2005, 14 pages.
Brandozzi, M. et al., "Transforming Goal Oriented Requirement Specifications into Architecture Prescriptions," 8 pages.
Crain, A., "The Simple Artifacts of Analysis and Design, " IBM Software Group, 2004, printed from the internet at <http://www.ibm.com/developerworks/rational/library/4871.html> on Aug. 18, 2011, 7 pages.
Curtis, Dr. B., Best Practices for Requirements Development and Management, Borland Software Corporation, 2005, 36 pages.
Dashofy, E. M. et al., "A Comprehensive Approach for the Development of Modular Software Architecture Description Languages," ACM Transactions on Software Engineering and Methodology, vol. 14, No. 2, 2005, pp. 199-245.
Duan, M., "Ravenflow Seeks to Eliminate Software Ambiguity, Errors," Silicon Valley / San Joes Business Journal, Nov. 17, 2006, 2 pages.
European Search Report dated Jul. 16, 2010 for EP Application No. 10000780.6, 8 pages.
Extended European Search Report dated Nov. 4, 2009 for EP Application No. 08020182.5, 9 pages.
Extended European Search Report dated Apr. 20, 2011 for EP Application No. 11001270.5-1238, 6 pages.

(56) References Cited

OTHER PUBLICATIONS

Fantechi, A. et al., "A Content Analysis Technique for Inconsistency Detection in Software Requirements Documents," Dipartimento di Sistemi e Informatica Universita degli Studi di Firenzi, Italy, 12 pages, Dec. 14, 2011.
Glass, R. L., *Facts and Fallacies of Software Engineering*, Addison Wesley, copyright 2003, 150 pages.
Grunbacher, P. et al., "Reconciling Software Requirements and Architectures: The CBSP Approach," Proceedings of the 5th IEEE International Symposium on Requirements Engineering, Toronto, Canada, 2001, 10 pages.
Hall, J. G. et al., "Relating Software Requirements and Architectures using Problem Frames," The Open University, UK, 8 pages, Dec. 14, 2011.
Hooks, I. F., "Managing Requirements," Crosstalk, The Journal of Defense Software Engineering, vol. 17, No. 8, Aug. 2004, 8 pages.
IBM DeveloperWorks: Rational Software Architect, printed from the internet at <http://www.ibm.com/developerworks/rational/products/rsa/> on Aug. 18, 2011, 2 pages.
IEEE Recommended Practice for Architectural Description of Software-Intensive Systems, The Institute of Electrical and Electronics Engineering, Inc., 2000, 29 pages.
IEEE Recommended Practice for Software Requirement Specifications, IEEE/ANSI Standard 830-1998, Institute of Electrical and Electronics Engineers, 1998, 39 pages.
IEEE Standard Glossary of Software Engineering Terminology, IEEE Std. 610.12-1990, Standards Coordinating Committee of the Computer Society of the IEEE, New York, Sep. 1990, 84 pages.
"Information Technology—Open Distributed Processing—Reference model: Architecture," International Standard, ISO/IEC 10746-3, 1st Ed. 1996, 68 pages.
"Information technology—Open Distributed Processing—Reference model: Foundations" ISO/IEC 10746-2, 1st Ed., 1996, 28 pages.
Jain, P. et al., "Automated Review of Natural Language Requirements Documents: Generating Useful Warnings with User-extensible Glossaries Driving a Simple State Machine," ISEC '09, ACM, 2009, pp. 37-45.
Jena—A Semantic Web Framework for Java, printed from the internet at <http://jena.sourceforge.net>, last retrieved on Oct. 10, 2008, 1 page.
Keshav, R. et al., "Towards a Taxonomy of Architecture Integration Strategies," the 3rd International Software Architecture Workshop, 1998, 4 pages.
Kruchten, P., "An Ontology of Architectural Design Decisions in Software-Intensive Systems," 2004, 8 pages.
Kruchten, P., "Architectural Blueprints—The "4+1" View Model of Software Architecture," IEEE Software, vol. 12, No. 6, 1995, 15 pages.
Lami, G. et al., "An Automatic Tool for the Analysis of Natural Langauge Requirements," published as Technical Report 2004-TR-40, Consiglio Nazionale delle Ricerche, Instituto di Scienza e Tecnologie dell'Informazione 'A.Faedo', 2004, 21 pages.
Lami, G., "QuARS: A Tool for Analyzing Requirements," Software Engineering Measurement and Analysis Initiative, Technical Report, 2005, 46 pages.
Lau, K-K. et al., "A Taxonomy of Software Component Models," Proceedings of the 2005 31st EUROMICRO Conference on Software Engineering and Advanced Applications, IEEE, 2005, 8 pages.
Liu, D. et al., "Natural Language Requirements Analysis and Class Model Generation Using UCDA," IEA/AIE, Springer-Verlag, 2004, pp. 295-304.
Maiden, N. A. et al., "Acquiring COTS Software Selection Requirements," IEEE Software, 1998, pp. 46-56.
Mattsson, A. et al., "Modelling Architectural Design Rules in UML," Proceedings of EMMSAD, 2008, pp. 71-79.
Medvidovic, N. et al., "A Classification and Comparison Framework for Software Architecture Description Languages," IEEE Transactions on Software Engineering, vol. 26, No. 1, 2000, pp. 70-93.
Mehta, N. R. et al., "Towards a Taxonomy of Software Connectors," 10 pages, Dec. 14, 2011.
"Modeling," Software Development Times, Jun. 1, 2007, 2 pages.
Morisio, M. et al., "Definition and Classification of COTS: A Proposal," ICCBSS, Orlando, FL, 2002, 10 pages.
OWL Web Ontology Language Overview, W3C, available from http://www.w3.org/TR/owl-features/, last retrieved on Oct. 10, 2008, 13 pages.
Partial European Search Report dated Aug. 14, 2009 for EP Application No. 08020182.5, 6 pages.
Raven Professional Includes Five New Modules, Computer Magazine, Nov. 2006, p. 85.
Raven Software, URL: available at www.ravensoft.com last retrieved Aug. 26, 2010, 1 page.
Ravenflow website, 2005-2006, http://www.ravenflow.com, last accessed on Jan. 30, 2008, 71 pages.
Rech, J. et al., "Intelligent Assistance in German Software Development: A Survey," 9 pages, Dec. 14, 2011.
Robinson, W. N. et al., "Requirements Interaction Management," ACM Computing Surveys, vol. 35, No. 2, Jun. 2003, pp. 1-59.
Robinson, W. N. et al., "Requirements Interaction Management," Georgia State University, Department of Computer Information Systems Working Paper 99-7, Aug. 30, 1999, 68 pages.
Rubinstein, D., "Quoth the Ravenflow: Drag-and_Drop Nevermor: Requirments Suite Generates UML Diagrams from Plain Text," Software Development Times, Mar. 15, 2006, Issue No. 146, 1 page.
Schindler, E., "Learning to Speak 'User'," Digital Producer Magazine, Mar. 2006, 2 pages.
Schmerl, B. et al., "AcmeStudio: Supporting Style-Centered Architecture Development," in Proc. 2004 International Conference on Software Engineering, Edinburgh, Scotland, 2004, 2 pages.
Schmidt, D., "Model-Driven Engineering," IEEE Computer Society, 2006, pp. 25-31.
Selic, B. "The Pragmatics of Model-Driven Development," IEEE Software, 2003, pp. 19-25.
Shahin, M. et al., "Improving Understandability of Architecture Design through Visualization of Architectural Design Decision," SHARK '10, ACM, 2010, 8 pages.
Skyway Software, printed from the internet at <http://www.skywaysoftware.com/> on Aug. 22, 2011, 3 pages.
Statement in Accordance with the Notice from the European Patent Office dated Oct. 1, 2007 Concerning Business Methods, sent with Extended European Search Report, Nov. 2007, 2 pages.
The Declaration of Independence: Six Principles to Benefit You and Your Agile Organization, Better Software, www.StickMinds.com, Jun. 2006, pp. 24 and 36.
The Protege Ontology Editor and Knowledge Acquisition System, printed from the internet at <http://protege.stanford.edu/> on Aug. 16, 2011, 2 pages.
Tolvanen, J-P. et al., "Defining Domain-Specific Modeling Languages to Automate Product Derivation: Collected Experiences," SPLC 2005, pp. 198-209.
van Lamsweerde, A. et al., "Managing Conflicts in Goal-Driven Requirements Engineering," IEEE Transactions on Software Engineering, Special Issue on Managing Inconsistency in Software Development, Nov. 1998, pp. 1-21.
Verma, K. et al., "Requirements Analysis Tool: A Tool for Automatically Analyzing Software Requirements Documents," ISWC 2008, Springer-Verlag, 2008, pp. 751-763.
Wiegers, K. E., Software Requirements, Chapters 1-13, Microsoft Press, Redmond, 2003, 262 pages.
Wiegers, K. E., Software Requirements, Chapters 14—Appendix D, Microsoft Press, Redmond, 2003, 278 pages.
Wilson, W. M. et al., "Automatic Quality Analysis of Natural Language Requirement Specification," NASA, The Goddard Space Flight Center's Software Assurance Technology Center, http://satc.gsfc.nasa.gov/support/PNSQC-_OCT96/phq.html, dated Oct. 1996, pp. 1-19.
YACC, URL: available at http://dinosaur.compilertools.net/yaac, last retrieved Apr. 29, 2010, 24 pages.
Yoo, J. et al., "A Formal Software Requirements Specification Method for Digital Nuclear Plant Protection Systems," The Journal of Systems and Software, vol. 74, 2005, pp. 73-83.

(56) References Cited

OTHER PUBLICATIONS

Young, R.R. 2000 Effective Requirements Practices, Addison-Wesley Longman Publishing Co, Inc. 2001, 387 pages.

Zimmermann, O. et al., "Managing Architectural Decision Models with Dependency Relations, Integrity Constraints, and Production Rules," 36 pages, Dec. 14, 2011.

Mehta, N. R. et al., "Towards a Taxonomy of Software Connectors," in Proceedings of the 22nd International Conference on Software Engineering, 2000, pp. 178-187.

Offutt, J. et al., "Generating Tests from UML Specifications," U.S. National Science Foundation under grant CCR-98-04111 and Rockwell Collins, Inc., Robert Franc and Bernhard Rurape (Eds.), '99, LNCS 1723, 1999, pp. 416-429.

Paolucci, M. et al., "Semantic Matching of Web Services Capabilities," International Semantic Web Conference (ISWC), Sandinia, Italy, Jun. 9-12, 2002, pp. 333-347.

Pyysalo, S. et al., "Analysis of Link Grammar on Biomedical Dependency Corpus Targeted at Protein-Protein Interactions," JNLPBA '04 Proceedings of the International Joint Workshop on Natural Language Processing in Biomedicine and its Applications, 2004, pp. 15-21.

Rech, J. et al., "Intelligent Assistance in German Software Development: A Survey," IEEE Software, vol. 24, No. 4, 2007, pp. 72-79.

Zimmermann, O. et al., "Managing Architectural Decision Models with Dependency Relations, Integrity Constraints, and Production Rules," Journal of Systems and Software, vol. 82, No. 8, Aug. 2009, 36 pages.

* cited by examiner

FIG. 7

| Select Requirement Type | | Definition Inspector: You are now entering/editing a Definition requirement | |
|---|---|---|---|
| Declarative | | *Requirement category: Application Requirements ▾ | |
| New Capability | | ⊙ Add optional condition | Examples: |
| New Function | | Article: ▾ ~804 | 1. Total sale value is defined as total item value plus sales tax. |
| New Action Constraint | | *Entity being defined: Total sale value ~806 802 | |
| New Attribute Constraint | | *Modal phrase: is defined as ▾ ~808 | 2. A customer without credit clearance is classified as cash-only. |
| New Definition | | * Entity's definition: total item value plus sales tax. | |
| New Policy | | ~810 | 3. A graduate student who a grade-point average above 3.5 is classified as an honor student |
| Use Case | | Update glossary: ☑ ~812 | |
| New Use Case | | | ~814   ~815 |
| New Use Case Step | | 816 Requirement preview: Total sale value is defined as total item value plus sales tax. | |
| New Alternate Flow | | | |
| Agile | | Create   Clear ~818 | |
| New User Stories | | | |

402

| B3 | ⓧ ✓ fx | Total sale value is defined as total item value plus sales tax. | | | | | | | |
|---|---|---|---|---|---|---|---|---|---|
| | A | B | C | D | E | F | G | H | I |
| 1 | Id | Description | | | | | | | |
| 2 | Application Requirements | | | | | | | | |
| 3 | Definition1 | Total sale value is defined as total item value plus sales tax. | | | | | | | |

| | B4 | | fx | A project manager or resource manager can request for an employee allocation. | | | | | |
|---|---|---|---|---|---|---|---|---|---|
| | A | | B | C | D | E | F | G | |
| 1 | | Use Case | | | | | | | |
| 2 | | Summary | | | | | | | |
| 3 | Use Case Name: | Employee Allocation | | | | | | | |
| 4 | Description: | A project manager or resource manager can request for an employee allocation. | | | | | | | |
| 5 | Actors: | Development Manager, Project Manager | | | | | | | |
| 6 | Pre-Conditions: | | | | | | | | |
| 7 | Triggers | | | | | | | | |
| 8 | Post-Conditions: | | | | | | | | |
| 9 | Inclusions: | | | | | | | | |
| 10 | Extension Points: | | | | | | | | |
| 11 | Data Dictionary References: | | | | | | | | |
| 12 | | | | | | | | | |
| 13 | | Main Flow | | | | | | | |
| 14 | StepID | Description | | | | | | | |

FIG. 10B

| | B4 | ○ | $f_x$ | Development Manager updates email project record status report successfully | | | | |
|---|---|---|---|---|---|---|---|---|
| | A | | B | | C | D | E | F | G |
| 1 | | | | | | | | | |
| 2 | | | | | | | | | |
| 3 | Use Case Name: | | Employee Allocation | | | | | | |
| 4 | Description: | | A project manager or resource manager can request for an employee allocation. | | | | | | |
| 5 | Actors: | | Development Manager, Project Manager | | | | | | |
| 6 | Pre-Conditions: | | | | | | | | |
| 7 | Triggers | | | | | | | | |
| 8 | Post-Conditions: | | | | | | | | |
| 9 | Inclusions: | | | | | | | | |
| 10 | Extension Points: | | | | | | | | |
| 11 | Data Dictionary References: | | | | | | | | |
| 12 | | | Main Flow | | | | | | |
| 13 | | | Description | | | | | | |
| 14 | StepID | | | | | | | | |
| 15 | UC-1 | | Development Manager updates email project record status report successfully | | | | | | |

FIG. 11B

| | B20 | | fx | Project Manager is notified to of invalid details | | | | | | |
|---|---|---|---|---|---|---|---|---|---|---|
| | A | | | B | C | D | E | F | G | |
| 3 | Use Case Name: | | | Employee Allocation | | | | | | |
| 4 | Description: | | | A project manager or resource manager can request for an employee allocation. | | | | | | |
| 5 | Actors: | | | Development Manager, Project Manager | | | | | | |
| 6 | Pre-Conditions: | | | | | | | | | |
| 7 | Triggers | | | | | | | | | |
| 8 | Post-Conditions: | | | | | | | | | |
| 9 | Inclusions: | | | | | | | | | |
| 10 | Extension Points: | | | | | | | | | |
| 11 | Data Dictionary References: | | | | | | | | | |
| 12 | | | | | | | | | | |
| 13 | | | | Main Flow | | | | | | |
| 14 | StepID | | | Description | | | | | | |
| 15 | UC-1 | | | Development Manager updates email project record status report successfully | | | | | | |
| 16 | | | | | | | | | | |
| 17 | | | | Alternate Flow for UC-1 | | | | | | |
| 18 | Name: | | | Innovative Employee Allocation Request | | | | | | |
| 19 | Scenario | | | Invalid details provided in the allocation request | | | | | | |
| 20 | Post Condition(s): | | | Project Manager is notified to of invalid details | | | | | | |
| 21 | StepID | | | Description | | | | | 1014 | |

REQUIREMENT STATEMENT MANIPULATION SYSTEM

TECHNICAL FIELD

This application relates to a system for manipulation of requirement statements, and more particularly, to a system configured to create and edit various types of requirement statements.

BACKGROUND

Organizations typically endeavor to become more efficient in operating regardless of the organization domain. Organizations also typically implement various systems, such as software systems, in carrying out particular operations. These systems may be initially expressed through documents describing operation of the systems. These documents may include lists of requirements that the organization desires in order to design the system as intended. The requirements may be described by requirement statements. Conformity and consistency in the structure of requirement statements describing various aspects of the system may be desired to allow clearer system descriptions, which may facilitate system development. However, in some circumstances, multiple individuals or groups may create requirement statements for a particular system, which may lead to inconsistent requirement statement structure.

SUMMARY

According to one aspect of the disclosure, an interactive requirement manipulation system may manipulate one or more requirement statements of various types. The interactive requirement manipulation system may receive one or more inputs associated with manipulation of a requirement statement of a particular requirement type. The interactive requirement manipulation system may generate an output to provide an interactive visual environment on a display. The interactive requirement manipulate system may provide a requirement-type-specific window to allow manipulation of the requirement statement. The interactive requirement manipulation system may allow creation and editing of the requirement statement.

The interactive requirement manipulation system may store a created or edited requirement statement. The interactive requirement manipulation system may access a database to store the manipulated requirement statements. The requirement statements may be hierarchically related. The interactive requirement manipulation system may allow a particular hierarchical relationship to be created and edited and visually indicated through the interactive visual environment. The stored requirement statements may be subsequently recalled for further editing.

Further objects and advantages of the present invention will be apparent from the following description, reference being made to the accompanying drawings wherein the preferred embodiments of the present invention are clearly shown.

BRIEF DESCRIPTION OF THE DRAWINGS

The innovation may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

FIG. 7 is an example of an attribute constraint inspector window of the interactive visual environment of FIG. 4.

FIG. 8 is an example of a definition inspector window of the interactive visual environment of FIG. 4.

FIGS. 10A and 10B are an example of a use case inspector window of the interactive visual environment of FIG. 4.

FIGS. 11A and 11B are an example of a use step inspector window of the interactive visual environment of FIG. 4.

FIGS. 12A and 12B are an example of a use case flow inspector window of the interactive visual environment of FIG. 4.

FIG. 13 is an example of a user stories inspector window of the interactive visual environment of FIG. 4.

DETAILED DESCRIPTION

Organizations are typically structured to accomplish various tasks in order to operate in a desired manner. Organizations of various domains, such as banking, ecommerce, telecommunications, etc., may have domain-specific manners of accomplishing these tasks. Organizations may require structuring and organization of these tasks in a particular manner in order to carry out the tasks. For example, a banking institution may have a particular routine or process for carrying out a task such as handling an electronic deposit from a customer. When developing the particular routine or process for accomplishing a particular task, an organization may implement a set of requirements to be met. A requirement may be some active or passive event associated with a system of an organization that the organization may desire to occur in order to complete a related task. Requirements may be embodied by requirement statements. Each requirement statement may be a textual statement describing a desired aspect of the associated system. Various applications, such as software applications, may be designed through requirements statements. The textual form of requirement statements may be restricted by particular format for purposes of conformity.

Generation of requirement statements may be performed by various groups or individuals within an organization. However, due to the desired restriction of the particular format of the requirement statements, guidance may be desired in order to assist groups or individuals entering the requirement statements. Various types of requirement statements may be generated for a particular domain. Table 1 describes various types of requirement statements that may be generated for a particular system.

TABLE 1

| Requirement Statement Type | Description |
|---|---|
| Capability | A particular capacity of a domain-specific system. |
| Function | A particular purpose within a domain-specific system. |
| Action Constraint | A limitation of an ability of a domain-specific system. |
| Attribute Constraint | A limitation of a characteristic of a domain-specific system. |
| Definition | A meaning of a particular component in a domain-specific system. |
| Policy | A particular rule of a domain-specific system. |

The requirement types listed in Table 1 are non-exhaustive list of requirement types that may be used in modeling a particular system.

Figure 1:
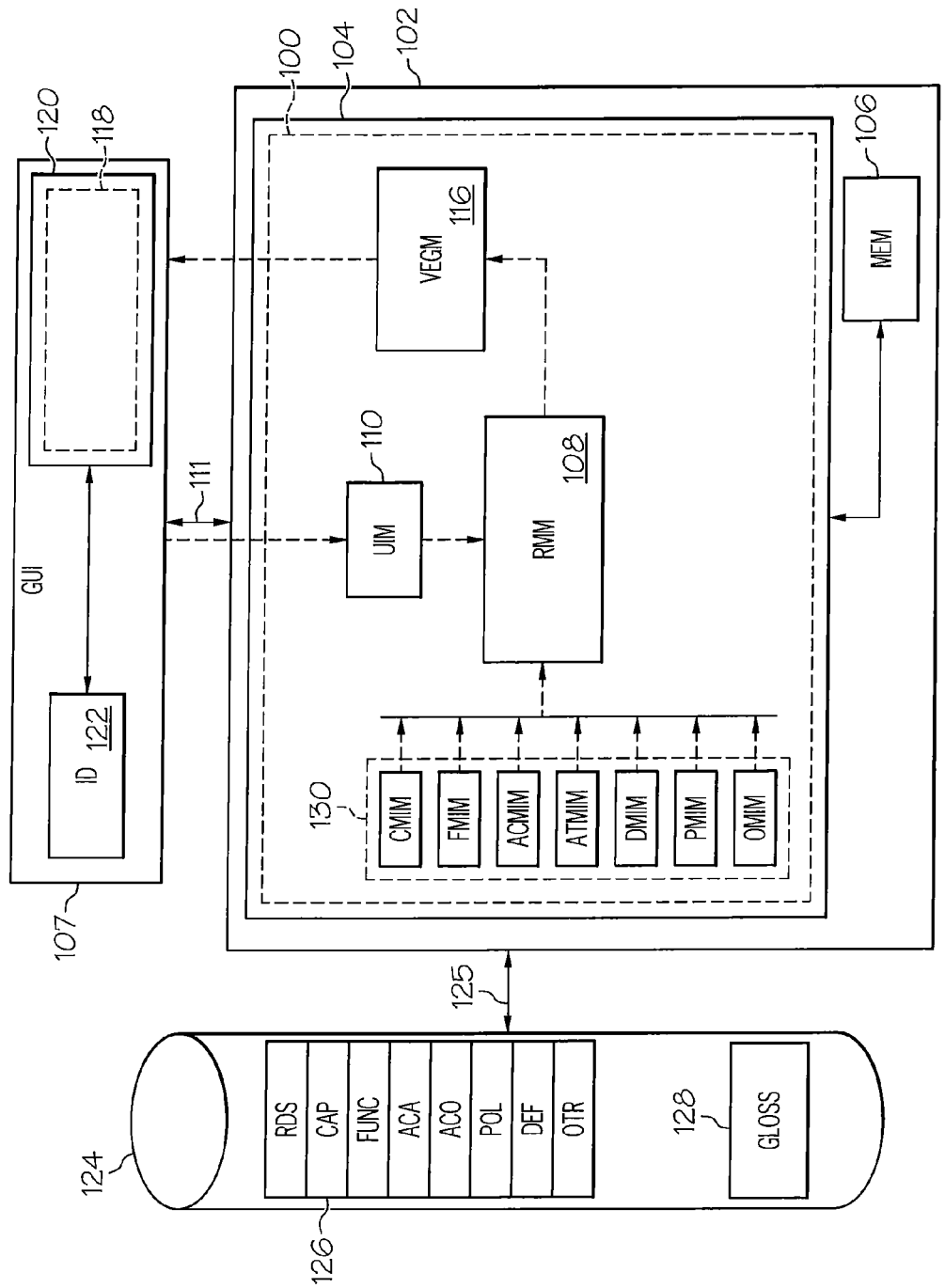
FIG. 1 is a block diagram of an example of an interactive requirement manipulation system executable on a computer device.

FIG. 1 is a block diagram of an example of an interactive requirement manipulation system (IRMS) 100. In one example, the IRMS 100 may be executed on a computer device 102. The IRMS 100 may include one or more modules executable by a processor 104 of the computer device 102. The IRMS 100 may be one or more software modules that may be stored on a memory device(s) such as memory 106 of the computer device 102. As described herein, the modules are defined to include software, hardware or some combination thereof executable by the processor 104. Software modules may include instructions stored in the memory 106, or other memory device(s), that are executable by the processor 104 or other processors. Hardware modules may include various devices, components, circuits, gates, circuit boards, and the like that are executable, directed, and/or controlled for performance by the processor 104. The memory 106 may include one or more memories and may be computer-readable storage media or memories, such as a cache, buffer, RAM, removable media, hard drive or other computer readable storage media. Computer readable storage media may include various types of volatile and nonvolatile storage media. Computer readable storage media is not a wire and any instructions stored thereon are not a signal. Various processing techniques may be implemented by the processor 104 such as multiprocessing, multitasking, parallel processing and the like, for example. The processor 104 may include one or more processors.

The IRMS 100 may provide an interactive environment through one or more graphical user interfaces (GUIs) 107 allowing creation, editing, and overall manipulation of various types of requirement statements. The IRMS 100 may include a requirement manipulation module (RMM) 108. The RMM 108 may create and edit requirement statements within the IRMS 100. In one example, the IRMS 100 may include a user interface module (UIM) 110. The UIM 110 may receive input from and transmit output to one or more GUIs 107 in communication the IRMS 100. In FIG. 1, the GUI 107 may communicate with the computer device 102 through a connection 111. In one example the connection 111 may be a physically-wired connection. The physically-wired connection may be network-based, such as a local area network (LAN), wide area network (WAN), Internet-based, virtual private network (VPN), or other suitable network configuration. In alternative examples, the connection 111 may be a wireless data connection connecting the computer device 102 to the GUI 107 via any of the network configurations described, as well as any other suitable network configuration. In other alternative examples, the GUI 107 may be physically integrated with the computer device 102.

The RMM 108 may be configured to provide output associated with requirement types to a visual environment generator module (VEGM) 116. The VEGM 116 may generate an output of an interactive visual environment 118 that may be provided to a display 120. In one example, the display 120 may be a component of the GUI 107. In alternative examples, the display 120 may be separate from and in addition to the GUI 107.

The IRMS 100 may interact with a user through an input device (ID) 122 of the GUI 107 in order to manipulate various types of requirement statements. The input device 122 may include one or more input devices such as a keyboard, mouse, microphone, touch screen, voice commands, or other suitable input devices. In alternative examples, the input device 122 may be physically independent from the GUI 107 and may be arranged in a wired or, alternatively, in wireless configuration, such as a handheld device.

The IRMS 100 may access a database 124. The database 124 may be accessed locally or from a remote location through a connection 125 or may be stored directly on the memory 106. In one example, the connection 125 may be a direct connection, network connection, or other suitable wired or wireless connection providing communication between the computer device 102 and a database 124. The database 124 may include a requirements data set (RDS) 126. The RDS 126 may include previously-created requirement statements. In one example, the requirements data set 126 may be arranged according to particular requirement types. For example, in FIG. 1, the RDS 126 may include various data sets associated with the requirement types listed in Table 1, such as capabilities (CAP), functions (FUNC), action capabilities (ACA), attribute constraints (ACO), policies (POL), definitions (DEF), and other requirement types (OTR). The database 124 may also include one or more glossaries (GLOSS) 128. The glossaries 128 may include terms specific to particular domains and may include associations and definitions used by the IRMS 100 in various manners as further explained.

The IRMS 100 may include a number of requirement manipulation interface modules 130. In FIG. 1, the requirement manipulation interface modules 130 may each be associated with the requirement types listed in Table 1. For example, the requirement manipulation interface modules 130 may include a capabilities manipulation interface module (CMIM), functions manipulation interface module (FMIM), action constraint manipulation interface module (ACMIM), attribute constraint manipulation interface module (ATMIM), definitions manipulation interface module (DMIM), policies manipulation interface module (PMIM), and other manipulation interface module (OMIM). The OMIM may be implemented for other requirement types not expressly described with regard to FIG. 1 (see FIGS. 10-14) In one example, each requirement manipulation interface module 130 may be used by the RMM 108 to ultimately generate a requirement-type-specific interactive visual environment 118.

Figure 2:
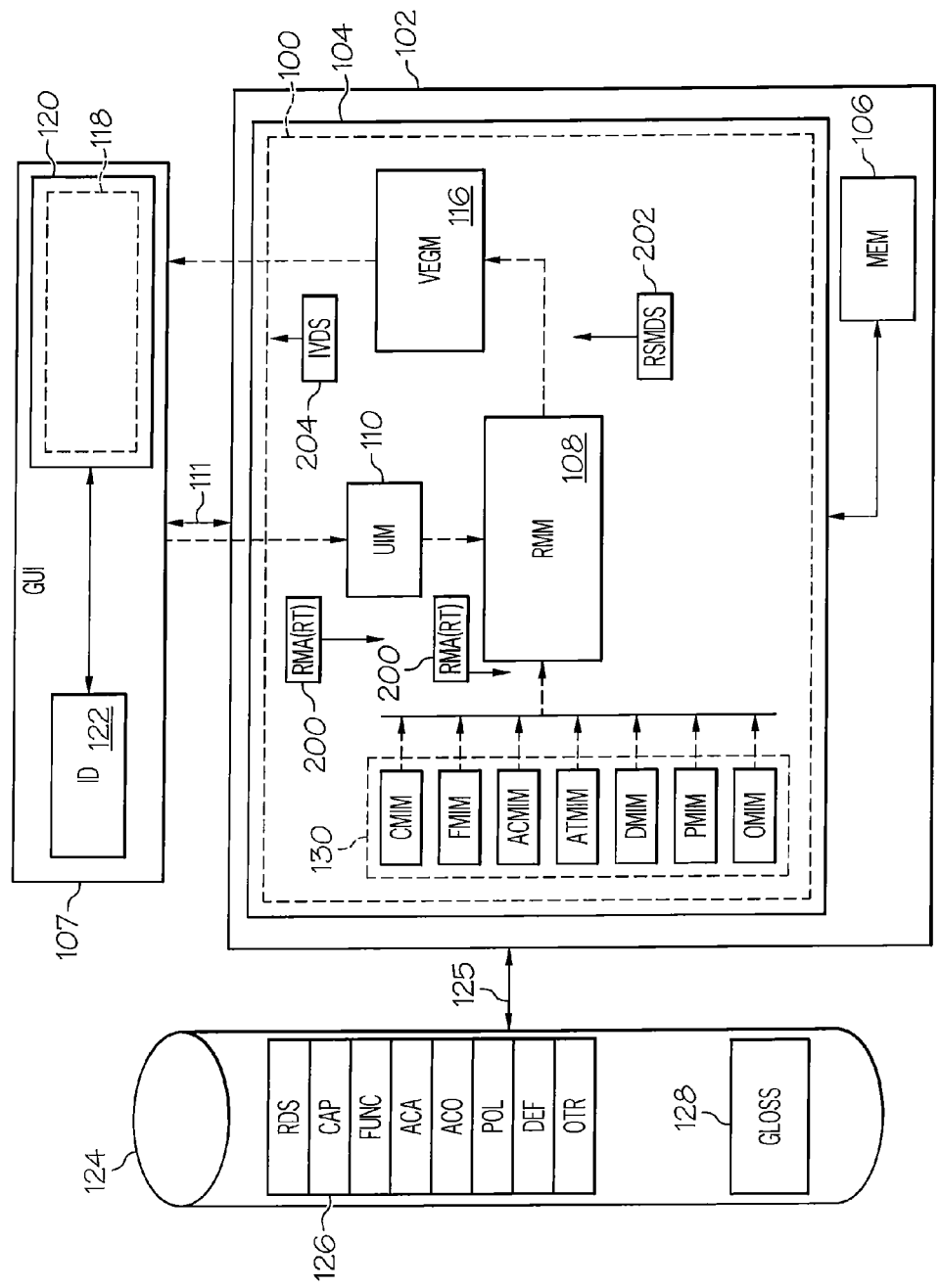
FIG. 2 is another block diagram of the interactive requirement manipulation system of FIG. 1.

FIG. 2 is an example of operation of the IRMS 100. A requirement manipulation action (RMA) input 200 may be received by the UIM 110 from the GUI 107. The RMA input 200 may be an input associated with a particular requirement type "(RT)". The UIM 110 may determine the validity of the RMA input 200. The UIM 110 may generate an error message (not shown) if the RMA input 200 is determined to be invalid. Upon determination that the RMA input 200 is valid, the UIM 110 may provide the RMA input 200 to the RMM 108. The RMM 108 may process the RMA input 200 and determine that the RMA input 200 is associated with the particular requirement type RT. The RMM 108 may utilize a particular requirement manipulation interface module 130 corresponding to the particular requirement type RT. By accessing the particular requirement manipulation interface module 130, the RMM 108 may generate a requirement-specific manipulation data set (RSMDS) 202. The RSMDS 202 may include data to be used in generating the interactive visual environment 118. In one example, the RSMDS 202 may include data extracted from the particular requirement manipulation interface module 130 that may be used to provide a requirement-specific interactive visual environment 118.

The RSMDS 202 may be provided to the VEGM 116. The VEGM 116 may generate an output of an interactive visual data set (IVDS) 204. The interactive visual data set 204 may include visual data to be processed by the display 120 in order to generate the interactive visual environment 118. During operation, the UIM 110 may periodically receive input from the input device 122 allowing the RMM 108 to periodically receive valid input from the UIM 110 in order to manipulate requirement-type data. The VEGM 116 may periodically provide an updated interactive visual data set 204 based on input received from the RMM 108 in order to provide dynamic feedback through the interactive visual environment 118 based on the RMA input 200.

Figure 3:
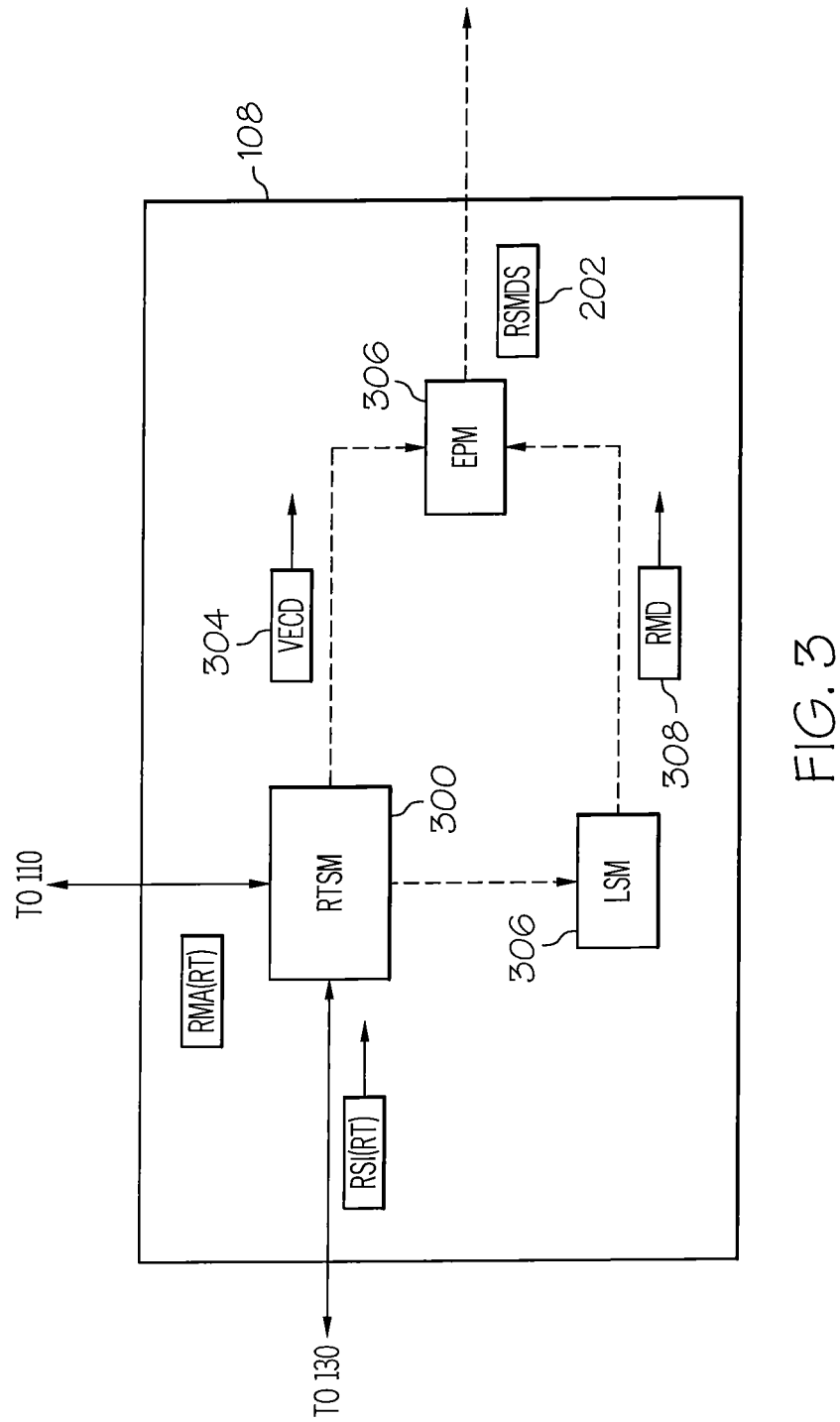
FIG. 3 is a block diagram of an example requirement manipulation module of the interactive requirement manipulation system of FIG. 1

FIG. 3 is a block diagram of an example of the RMM 108. The RMM 108 may include a requirement type selection module (RTSM) 300. The RTSM 300 may receive the RMA input 200. Upon receipt of the RMA input 200, the RTSM 300 may determine the particular requirement type RT associated with the RMA input 200 based on the content of the RMA input. The RTSM 300 may select the particular requirement manipulation interface module 130 corresponding to the particular requirement type RT. The RTSM 300 may retrieve requirement-specific information associate with a particular requirement type RT from the selected requirement manipulation interface module 130. Requirement-specific information (RSI) data 302 associated with the particular requirement type RT retrieved by the RTSM 300 may be related to various aspects of the IRMS 100, such as creation, deletion, or editing of a particular requirement statement.

In one example, the RMA input 200 may be associated with initially launching the interactive visual environment 118 without specific reference to a particular requirement type. In such a situation, the RTSM 300 may generate visual environment creation data (VECD) 305. The VECD 305 may include data associated with initial generation of the interactive visual environment 118. The VECD 305 may be received by an environment preparation module (EPM) 306. The EPM 306 may generate the RSMDS 202 to include data allowing the VEGM 116 to generate an initial interactive visual environment 118.

Once the interactive visual environment 118 has been initially generated, the RTSM 300 may receive RMA inputs 200 directed towards manipulation of a particular requirement type RT. Upon receipt of an RMA input 200 directed towards a particular requirement type RT, the RTSM 300 may access a particular requirement manipulation interface module 130 corresponding to the particular requirement type RT. For example, if the requirement type RT is directed towards a capability requirement type, the RTSM 300 may access the CMIM to appropriately address the RMA input 200.

The RTSM 300 may retrieve requirement-specific information (RSI) 304 from the corresponding requirement manipulation interface module 130, allowing the interactive visual environment 118 to allow manipulation of the particular requirement type RT. Upon retrieval of the RSI data 302, the RTSM 300 may process the RSI data 302 to determine the appropriate information to be included in the interactive visual environment 118. The RTSM 300 may selectively implement language selection module (LSM) 306. The LSM 306 may receive requirement manipulation data (RMD) 308 from the RTSM 300 associated with the particular requirement type RT. The RMD 308 may include data associated with manipulation of the particular requirement type RT and the particular type of manipulation desired as indicated in the RMA input 200.

The LSM 306 may generate the appropriate text to create requirement statements associated with the particular requirement type RT. For example, the RMA input 200 may be associated with creation of a requirement statement for the particular requirement type RT. The RTSM 300 may recognize that the RMA input 200 is directed towards creation of a requirement statement. The RMA input 200 may include particular language choices associated with generation of a requirement statement (see FIG. 4). The LSM 306 may select language for purposes of generating a requirement statement. For example, the RMA input 200 may be directed towards generation of a capability requirement statement. The RMA input 200 may include language and/or language selections directed towards a capability and an entity for performing the capability (see FIG. 4). The LSM 306 may generate language linking the entity with the capability such as a verb phrase, for example. The LSM 306 may select predetermined language, such as words or phrases, included in one or more of the glossaries 128. The predetermined words and phrases may also be stored in memory independent from the glossaries 128 in the database 124, the memory 106, or other storage devices.

The requirement manipulation data 308 may include data associated with updating the interactive visual environment 118 to include the information associated with the particular requirement type RT and the desired manner of manipulation of the requirement type RT, the requirement manipulation data 308 may be received by the EPM 306. The EPM 306 may generate the RSMDS 202 based on the requirement manipulation data 308. Alternatively, the RTSM 300 may generate the requirement manipulation data 308 in instances when the LSM 306 is not selectively implemented by the RTSM 300.

Figure 4:
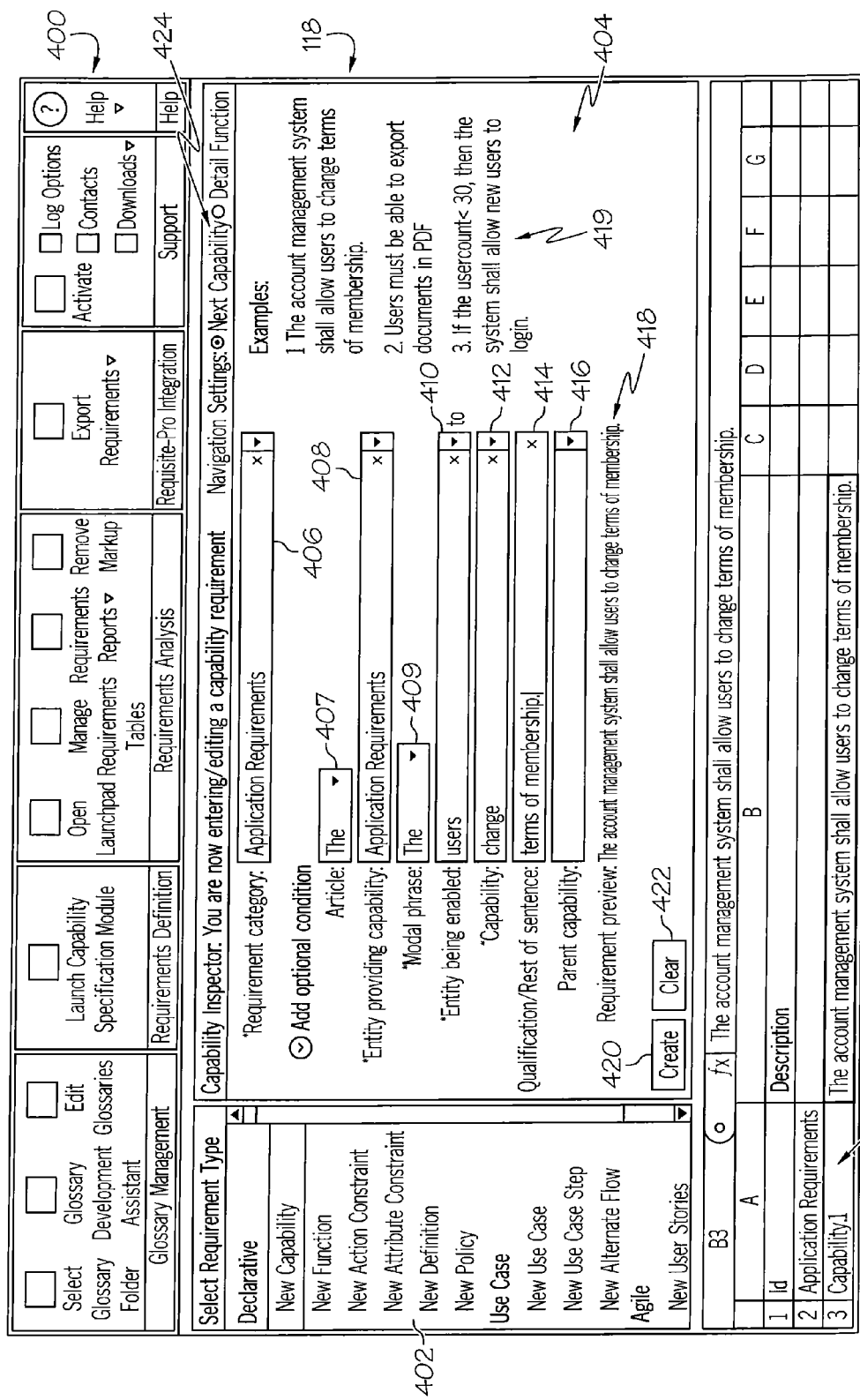
FIG. 4 is an example of an interactive visual environment of the interactive requirement manipulation system of FIG. 1.

FIG. 4 is an example of the interactive visual environment 118 in a capability requirement statement manipulation mode. In the example of FIG. 4, the interactive visual environment 118 may be based in an application such as Microsoft Excel produced by Microsoft Corp. of Redmond, Wash. In one example the interactive visual environment 118 may include a toolbar 400. The toolbar 400 may include various tools for use such as glossary tools and requirement-based tools. In one example, the toolbar 400 may allow the IRMS 100 to implement other features, such as those described in United States Patent Application Publication No. 2009/1038793 filed on May 15, 2008. The toolbar 400 may be present in the interactive visual environment 118 during manipulation of various requirement types, but is shown as absent in FIGS. 5-14 for ease of illustration.

The interactive visual environment 118 may include a various interactive windows. For example, the interactive visual environment 118 may include a requirement type selection window 402. The requirement type selection window 402 may provide various requirement types to be selected through use of the GUI 107. The requirement types may be organized into a declarative group, agile-based group (see FIGS. 10 and 11), and a use case group (see FIGS. 10-12). Other requirement type groups may also be implemented. In FIG. 4, selection of the requirement type "new capability" may be performed via the GUI 107, indicating that generation of a new capability requirement statement is desired. Upon selection of "new capability," a "capability inspector" window 404 may be provided. The capability inspector window 404 may provide various drop-down input fields and textual input fields to enable generation of a capability requirement statement. The capability inspector window 404 may allow a particular requirement category to be selected through "requirement category" drop-down field input 406. In one example, the requirement categories may be organized in the requirement data set 126 according to predetermined category selections and hierarchical relationships.

The capability inspector window may include an "article" drop-down field 407. The article drop-down field 407 may allow appropriate selection of "a," "an," "the," or no article for an "entity providing capability" drop-down input field 408. The input field 408 allows a particular entity to be selected that provides a capability described in the requirement statement being generated. A "modal phrase" drop down field 409 may allow selection of a particular verb or verb phrase to be selected indicating a particular action being taken by the entity of the input field 408. The input field 409 may include predetermined selections stored in the glossaries 128.

An "entity being enabled" drop-down input field 410 allows the selection of a particular entity that is to be enabled by the capability being generated for the requirement statement. The capability inspector window 404 may also provide a "capability" drop-down input field 412. The capability input field 412 may allow selection of a particular capability to be included in the requirement statement generated. The input fields 406, 407, 408, 410, and 412 may provide predetermined selections based on contents in the requirements data set 126 and glossaries 128. The glossaries 128 may include various categories recognized by the IRMS 100 allowing the IRMS to appropriately populate the input fields. A "qualification/rest of the sentence" textual input field 414 may allow other text to be provided as part of the requirement statement that is not considered part of the capability being described.

The capability inspector window 404 may also include a "parent capability" drop-down input field 416. Various parent capabilities included in the database 126 may be selected. Selection of a parent capability may automatically identify the capability requirement statement being created as a child of the selected parent capability. The capability inspector window 404 also includes a "requirement preview" field 418, which provides a dynamic view of the requirement statement in its current form as it is being created through the capability inspector window 404. As shown in the example of FIG. 4, the requirement statement includes text from the various input fields discussed to form the particular requirement statement.

The capability inspector window may also include examples 419 to provide sample requirement statements to convey some typical requirement statement formats that may be useful in creating a particular requirement statement through the capability inspector window 400. The capability inspector window 404 may also include a virtual create button 420 and a virtual clear button for 422. Selection of the create button 420 may create a requirement statement based on the input provided through the capability inspector window 404. Selection of the clear button 422 may clear all text fields and reset drop-down fields containing data.

The capability inspector window 404 may include a "navigation settings" field 424. In one example, the navigation settings field 424 may include a selection for "next capability" and "detailed function." Selection of "next capability" will result in the capability inspector window 404 allowing new input regarding another capability. Selection of "detailed function" will result in the interactive visual environment 118 providing a function requirement statement manipulation mode upon creation of a capability through the capability inspector window 404.

The interactive visual environment 118 in FIG. 4 may include an organization table 426 generated by the IRMS 100. The organization table 426 may provide organizational relationships among various requirement types. In FIG. 4, the organization table 426 includes three previously-created requirement statements associated with capabilities. Column A of the organization table 426 includes an identifier for the particular requirement statement. In FIG. 4, capability requirement statements are part of the requirement category of performance requirements. In one example, the requirement statements may be indexed by the requirement type and a reference number. For example, in FIG. 4 the listed requirement statement in column B is a capability requirement types as indicated by the term "Capability.1" The number following the term "Capability" indicates a particular numerical index for the corresponding requirement statement.

Figure 5:
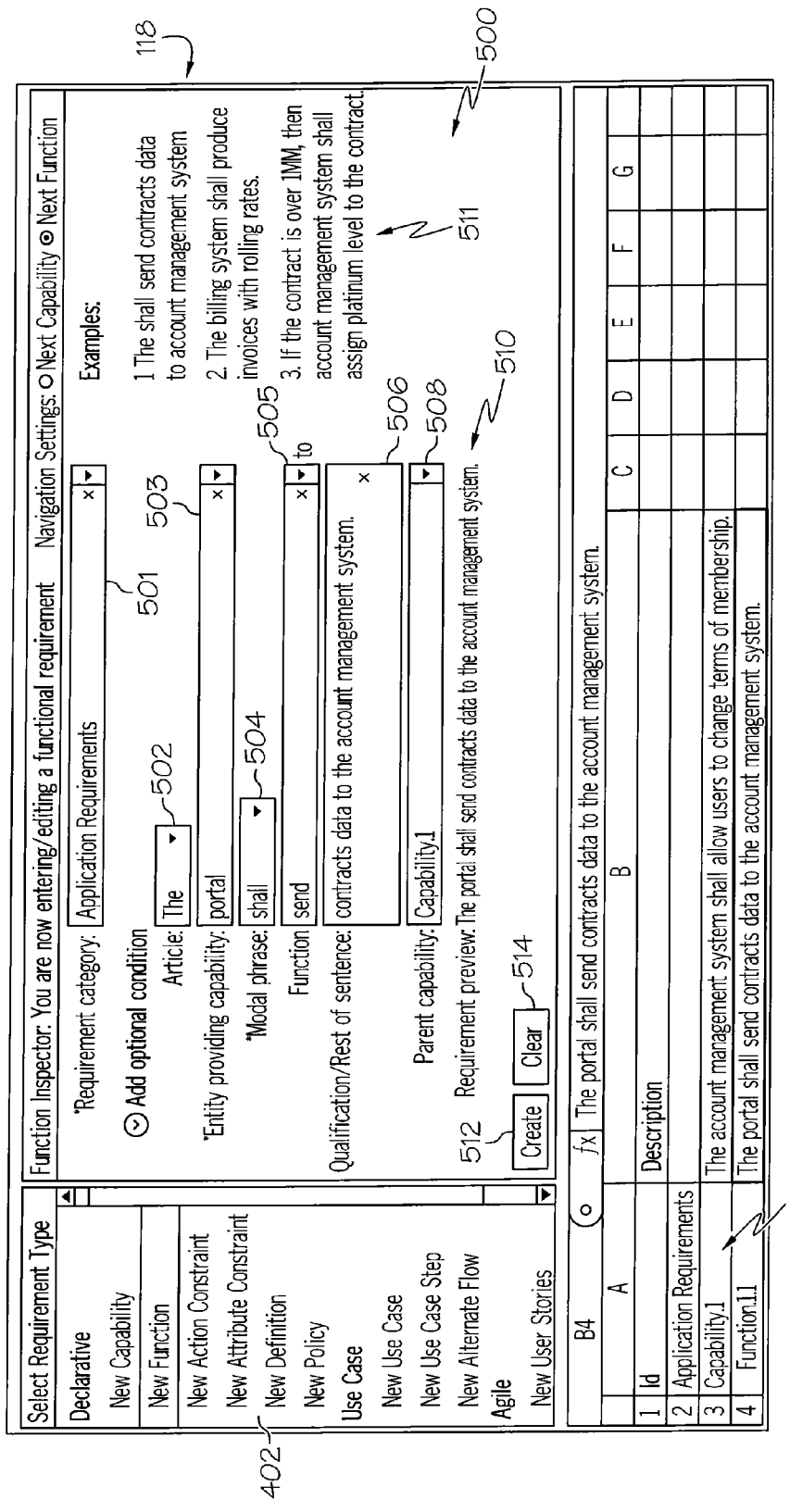
FIG. 5 is another example of the interactive visual environment of FIG. 4.

During operation of the IRMS 100, the "new function" requirement type may be selected through the requirement selection window 402. Upon selection of the "new function" requirement type, the RMM 108 may access the FMIM in order to provide a function capability statement manipulation mode in the interactive visual environment 118. In one example, as illustrated in FIG. 5, the RMM 108 may communicate with the VEGM 116 to generate a function inspector window 500. The function inspector window 500 may allow creation or editing of a functional requirement. In one example, the function inspector window 500 may include a "requirement category" drop-down input field 501, similar to the requirement category field 406. The function inspector window 500 may also include an "article" drop-down input field 502 similar to the capability inspector window 400. The function inspector window 500 may also include an "entity providing function" drop-down selection field 503. The entity providing function selection field 502 may access the glossaries 128 in providing various choices of entities in order to perform a particular function similar to that described with regard to FIG. 4.

The function inspector window 500 may also include a "modal phrase" drop-down input field 504 similar to that the capability inspector window 400. The function inspector window 500 may also include a "function" drop-down input field 505. The function field 505 may allow selection of a particular function to be included in the requirement statement generated. The function field 505 may be populated by the IRMS 100 using predetermined function stored in the glossaries 128. In one example, the function field 505 may receive selection input through the input device 122 to select a particular function. A "qualification/rest of sentence" textual input field 506 may be used to provide further context or details for a particular function selected in the function field 505.

The function inspector window 500 may include a "requirement preview" field 510 that may provide a currently-created requirement statement based on the input fields as currently populated. The function inspector window 500 may also include examples 511 to provide sample requirement statements to convey some typical requirement statement formats that may be useful in creating a particular requirement statement through the function inspector window 500.

The function inspector window 500 may also include a "parent capability" drop-down input field 508. In one example, a function may be a subset of a particular capability. The parent capability drop-down field 508 allows a particular function being created to be identified as a subset of a particular capability. The parent capability drop-down input field 506 may include previously-created capabilities. In the example of FIG. 5, the parent capability drop-down field 506 includes "Capability.1," which corresponds to the capability requirement statement "The account manipulation system shall allow users to change terms of membership." Upon selection of a virtual create button 512, the function requirement statement may be indicated as a subset of the parent capability appearing in the drop-down field 506. Selection of a virtual clear button 514 may clear all input fields.

Figure 6:
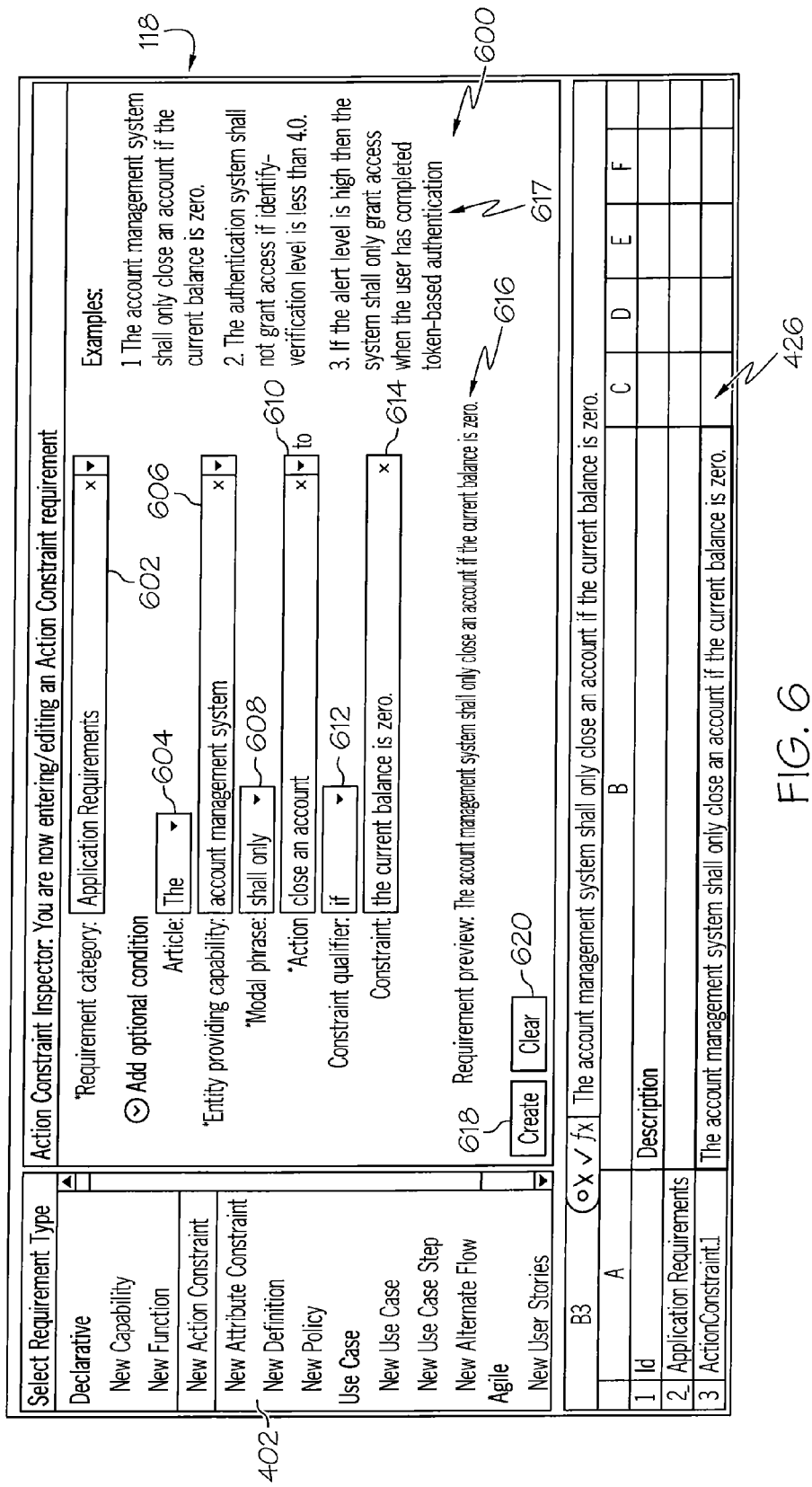
FIG. 6 is an example of an action constraint window of the interactive visual environment of FIG. 4.

Upon selection of "new action constraint" in the requirement selection window 402, the IRMS 100 may access the ACMI to ultimately generate an action constraint inspector window 600 provided by the interactive visual environment 118. FIG. 6 is an example of the action constraint inspector window 600. The action constraint inspector window 600 may include a "requirements category" drop-down input field 602 and an "article" drop-down input field 604 similar to that in the capability inspector window 400.

The action constraint inspector 600 may include an "entity being constrained" drop-down input field 606. The entity-being-constrained field 606 may include all or some of the entities listed in the glossaries 128 allowing an action constraint to be placed on any known entity. The action constraint inspector window 600 may also include a "modal phrase" drop-down input field 608 similar to that of the capability inspector window 400. The action constraint inspector window 600 may also include an "action" drop-down field 610 that may be populated by the IRMS 100 based on the contents of the glossaries 128. The action of the field 610 may be that to constrain the entity of the field 606.

The action constraint inspector window 600 may also include an "constraint qualifier" drop-down input field 612. The constraint-qualifier field 612 may be populated by the IRMS 100 from the glossaries 128 and may contain conditional language such as "if," "not," etc. that allows a particular constraint to be conditionally applied. The action constraint inspector window 600 may also include a "constraint" textual input field 614. The constraint field 614 may allow textual input to be received through the input device 122. Text input into the action constraint text field 614 may be interpreted as the action constraint associated with the entity under the constraint. The action constraint inspector window 600 may also include a requirement preview field 616. The requirement preview field 616 may dynamically and automatically provide the requirement statement as it is being created in the action constraint inspector window 600. The action constraint inspector window 600 may also include examples 617 to provide sample requirement statements to convey some typical requirement statement formats that may be useful in creating a particular requirement statement through the action constraint inspector window 600. The action constraint inspector window 600 may also include a virtual create button 618 that, when selected, may generate the requirement statement based on content of the various input fields. A virtual clear button 620 may be selected to clear input fields. The requirement statement generated may be viewed in the organization table 426 using similar format as that described regarding the capabilities and functions. Selection of an action constraint in the organization may allow the action constraint to be edited.

Figure 7:
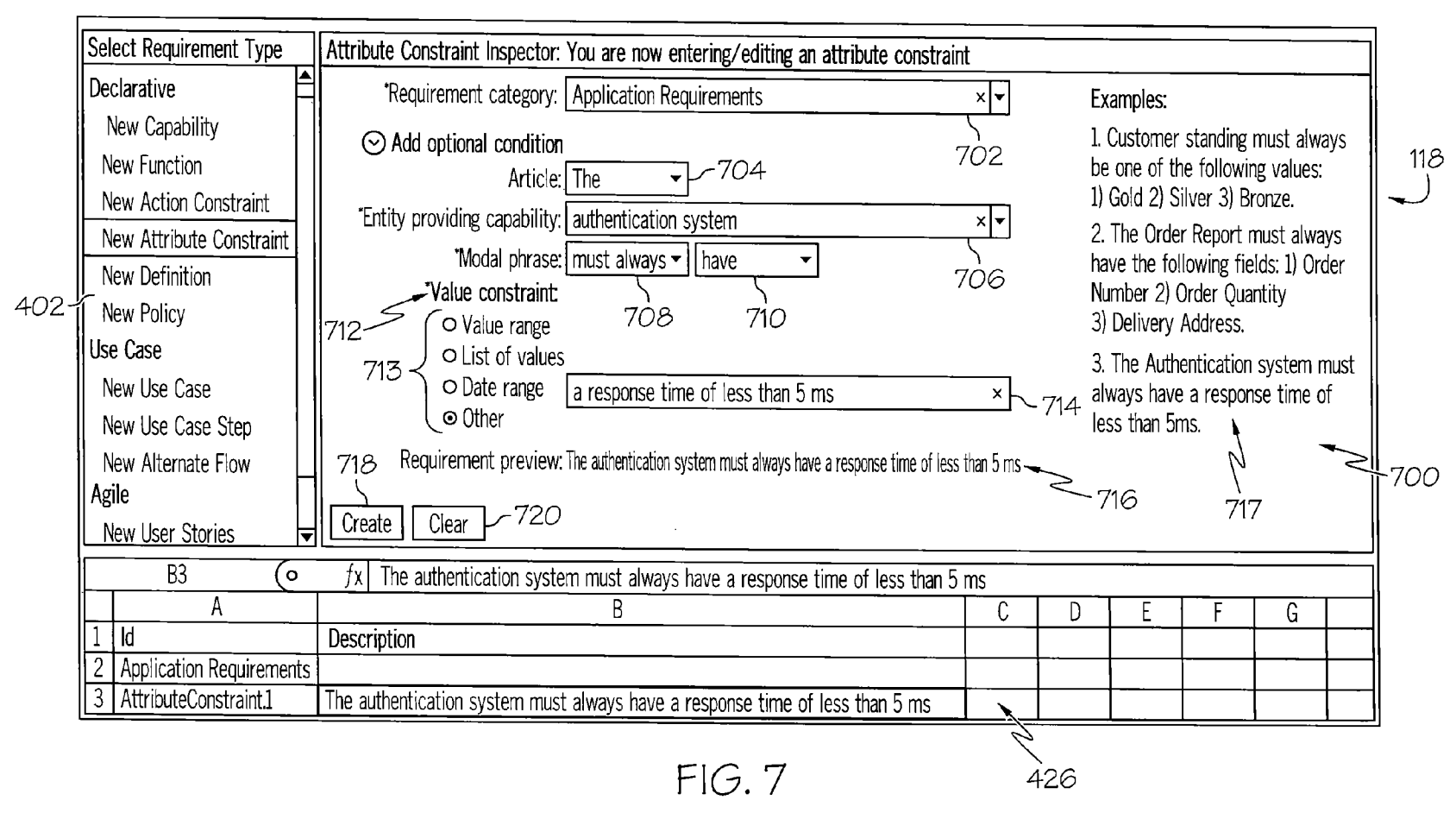

During operation of the IRMS 100, the "new attribute constraint" requirement type may be selected through the requirement selection window 402. Upon selection of the "new attribute constraint" requirement type, the RMM 108 may access the ATMI in order to ultimately provide an attribute constraint requirement statement manipulation mode in the interactive visual environment 118. FIG. 7 is an example of an attribute constraint inspector window 700 that may be included in the interactive visual environment 118. The attribute constraint inspector window 700 may be activated through selection of "new attribute constraint" in the requirement selection window 402. The attribute constraint inspector window 700 may allow a requirement statement associated with an attribute constraint to be generated. In one example, the attribute constraint inspector window 700 may include a "requirements category" drop-down input field 702 and an "article" drop-down input field 704 similar to that in the capability inspector window 400.

The attribute constraint inspector window 700 may include an "entity being constrained" drop-down input field 706. The entity-being-constrained field 706 may include all or some of the entities listed in the glossaries 128 allowing an action constraint to be placed on any known entity. The attribute constraint inspector window 700 may include "modal phrase/qualifier" drop-down fields 708 and 710. The field 708 may be populated and implemented in a manner similar to the field 409 of the capability inspector window. The field 710 may be populated with qualifying language for the particular modal phrase selection in field 708.

The attribute constraint inspector window 700 may also include a "value constraint" field 712. In one example, the value constraint field 712 may allow an attribute to be constrained through value ranges, value lists, and date ranges. In FIG. 7, the particular manner of constraint may be selected through one of the radio buttons 713. Upon selection of the particular radio button 713, input regarding the corresponding attribute constraint may be received through value field 714. For example, upon selection of the "range of values" radio button, numerical values may be input to provide a particular range. Alternatively, upon selection of the "list of values" field, lists may be input using alphanumeric characters. Upon selection of the "date range" field, drop-down calendars may be used to select "from" and "to" fields. The field "other" may allow textual input into field 714 to provide some other constraint type. For example, in FIG. 7, the "others" is selected with the phrase "a response time of less than 5 ms" input into the field 714. The attribute constraint inspector window 700 may include a "requirement preview" field 716. The requirement preview field 716 may dynamically and automatically indicate the attribute constraint being created based on the current values of the various input fields. The attribute constraint inspector window 700 may also include examples 717 to provide sample requirement statements to convey some typical requirement statement formats that may be useful in creating a particular requirement statement through the attribute constraint inspector window 700. The attribute constraint inspector window 700 may also include a virtual create button 718 that, when selected, may generate the requirement statement based on content of the various input fields. The requirement statement generated may be viewed in the organization table 426 using a similar format as that described regarding the capabilities and functions. Selection of an action constraint in the organization table 426 may allow the action constraint to be edited. The attribute constraint inspector window 700 may also include a virtual "create" button 708. Selection of the create button 708 may permanently store an attribute constraint entered through the attribute constraint inspector window 700 in the organization field as shown in FIG. 7. Selection of a virtual clear button 720 may clear the various input fields.

FIG. 8 is an example of a definition inspector window 800 that may be included in the interactive visual environment 118. The definition inspector window 800 may be activated through selection of "new definition" in the requirement selection window 402. In one example, the definition inspector window may be used to create a new definition requirement statement regarding a particular entity. In one example, the definition inspector window 800 may include a "requirements category" drop-down input field 802 and an "article" drop-down input field 804 similar to that in the capability inspector window 400.

The definition inspector window 800 may also include an "entity being defined" drop-down input field 806. The entity-being-defined field 806 may include all or some of the entities listed in the glossaries 128 allowing a definition to be applied to a known entity. The definition inspector window 800 may include a "modal phrase" drop-down input field 808 similar to that the capability inspector window 400. The definition inspector window 800 may include an "entity's definition" textual input field 810 that may receive textual input regarding a particular definition for the entity selected in the field 806. The definition inspector window 800 may also include an "update glossary" checkbox 812. Selection of the update glossary checkbox 812 allows the IRMS 100 to store the newly created definition in the glossaries 128.

The definition inspector window 800 may include a "requirement preview" field 814 that may provide a currently-created requirement statement based on the input fields as currently populated. The definition inspector window 800 may also include examples 815 to provide sample requirement statements to convey some typical requirement statement formats that may be useful in creating a particular requirement statement through the definition inspector window 800.

The definition inspector window 800 may also include a virtual create button 816 that, when selected, may generate the requirement statement based on content of the various input fields. Selection of the create button 816 may store the definition in the glossaries 128 when the update checkbox 812 is selected. The requirement statement generated may be viewed in the organization table 426 using similar format as that described regarding the capabilities and functions. Selection of a definition in the organization table 126 may allow the action constraint to be edited. Selection of a virtual clear button 818 may clear the various input fields.

Figure 9:
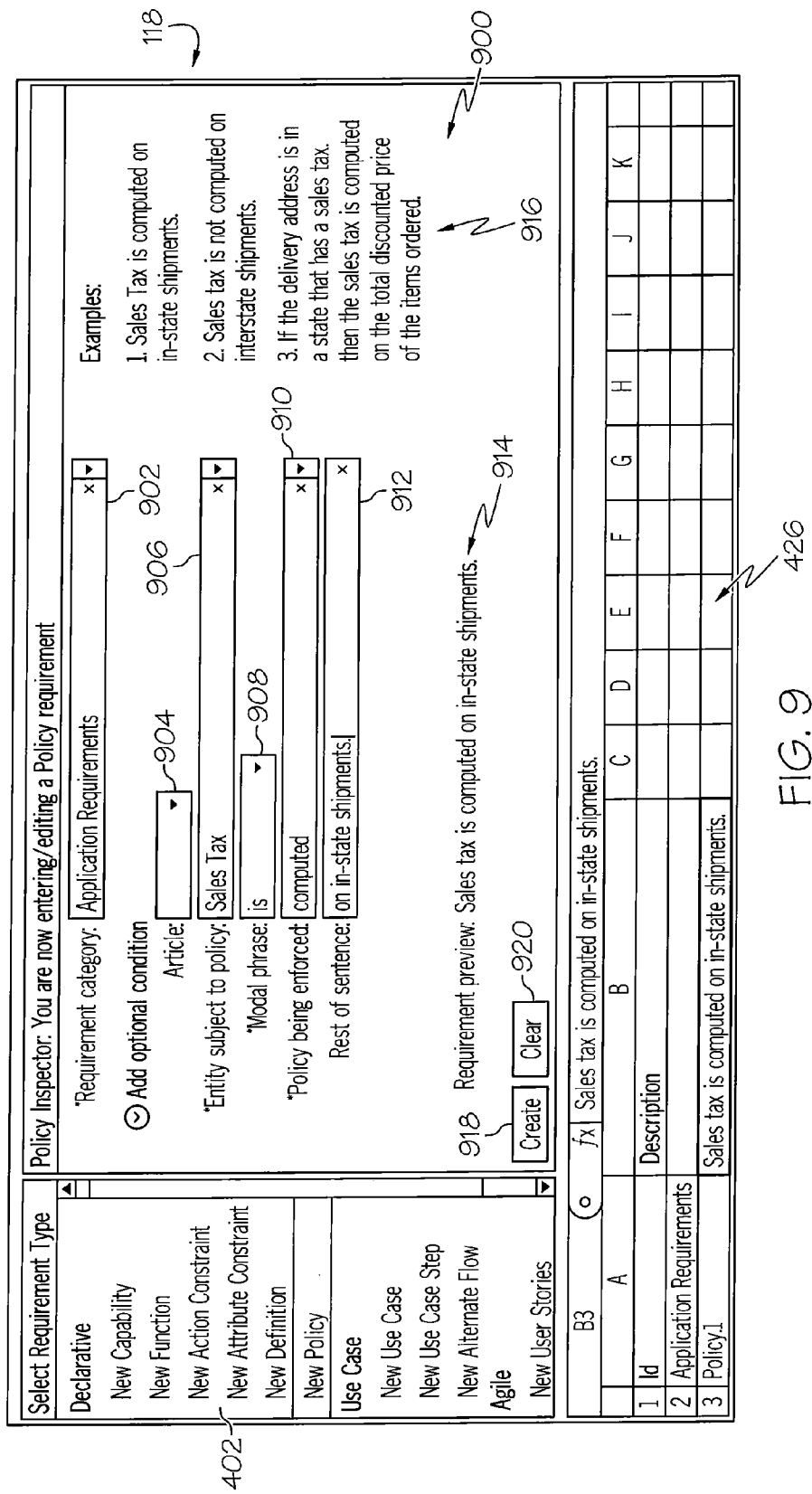
FIG. 9 is an example of a policy inspector window of the interactive visual environment of FIG. 4.
Figure 10A:
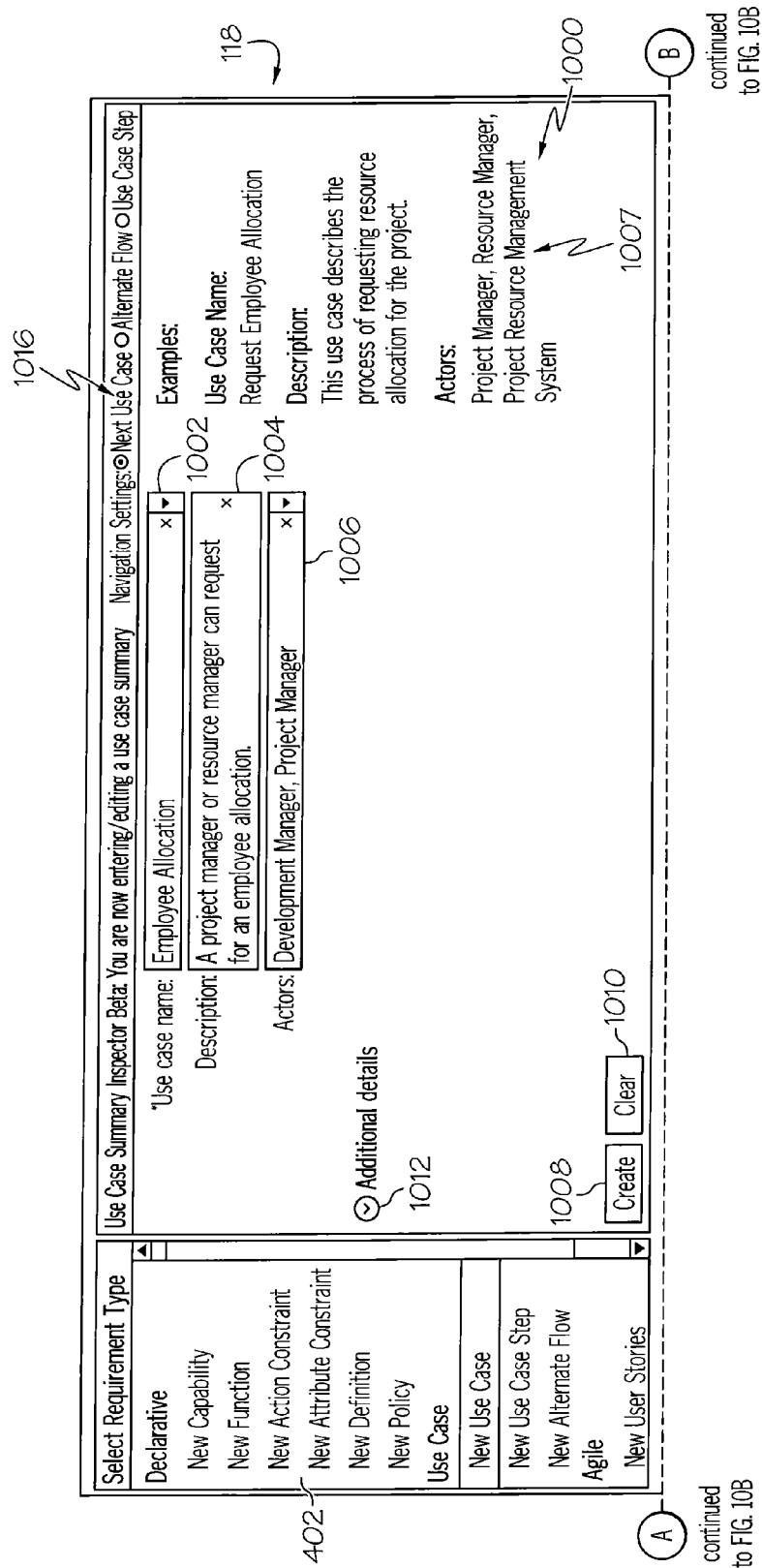
Figure 11A:
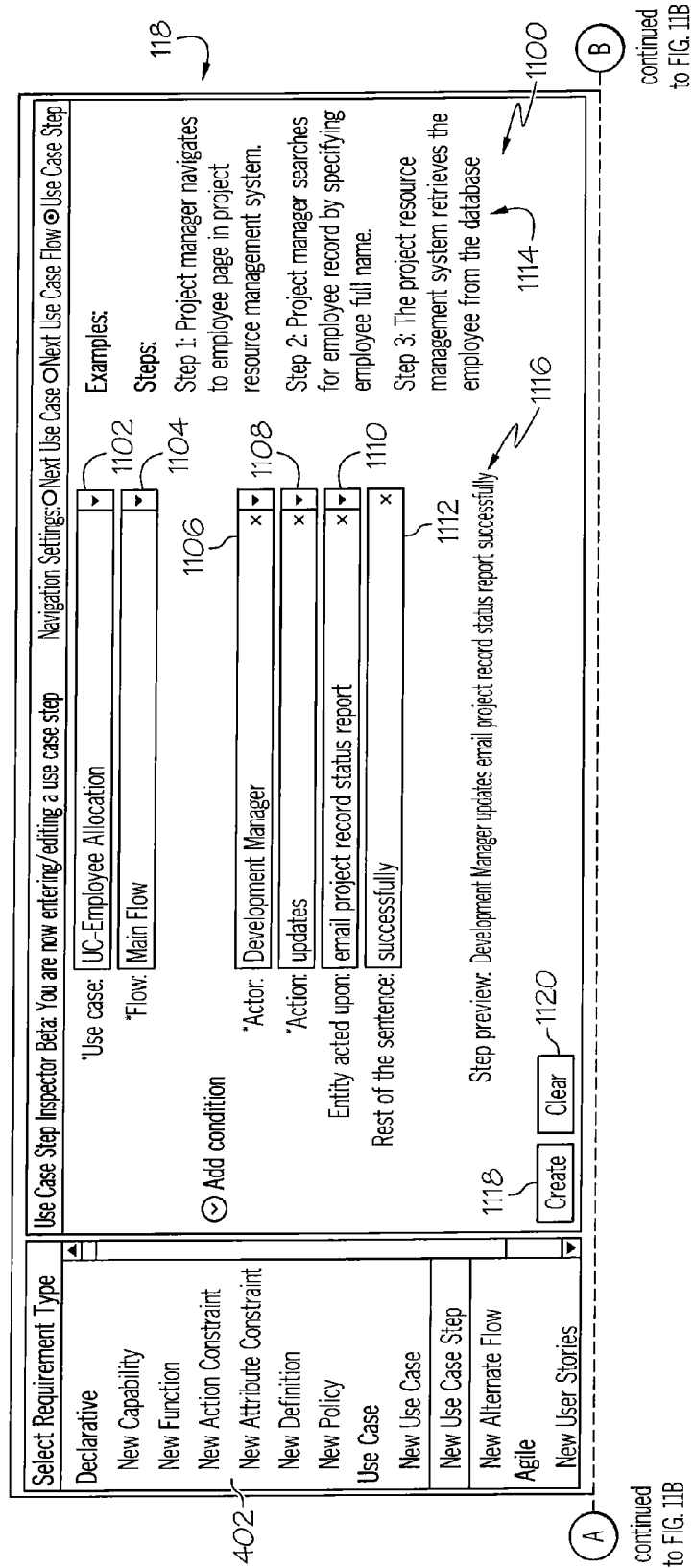
Figure 12A:
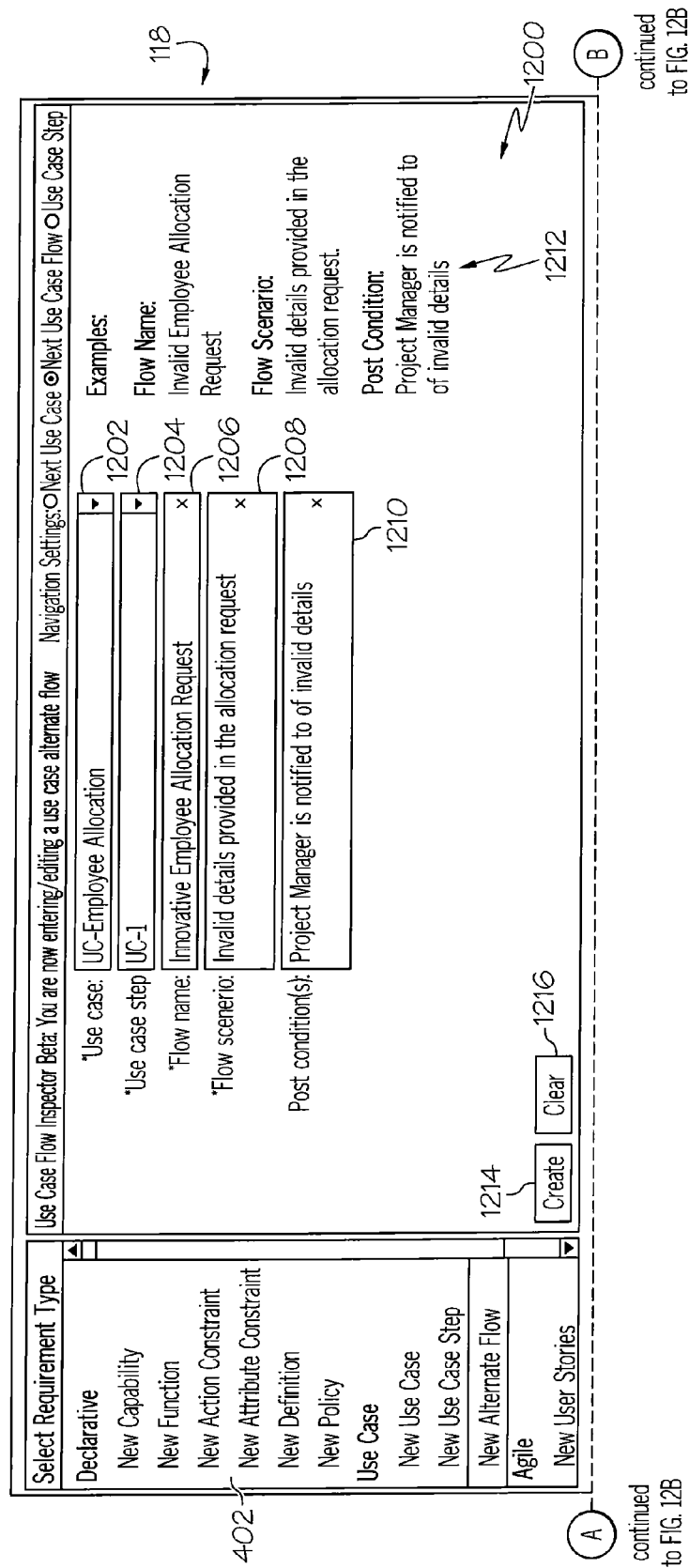

FIG. 9 is an example of a policy inspector window 900 that may be included in the interactive visual environment 118. The policy inspector window 900 may be activated through selection of "new policy" in the requirement selection window 402. In one example, the policy inspector window 900 may be used to generate a requirement statement indicating a policy being enforced by a particular entity. In one example, the policy inspector window 900 may include a "requirements category" drop-down input field 902 and an "article" drop-down input field 904 similar to that in the capability inspector window 400.

The policy inspector window 900 may also include an "entity subject to policy" drop-down input field 906. The entity-subject-to-policy field 906 may include all or some of the entities listed in the glossaries 128 allowing a definition to be applied to a known entity. The policy inspector window 900 may include a "modal phrase" drop-down input field 908 similar to that the capability inspector window 400. The policy inspector window 900 may include a "policy being enforced" drop-down input field 910. The field 910 may be populated by the IRMS 100 using appropriate terms located in the glossaries 128. The policy inspector window may include a "rest of sentence" textual input field 912 allowing additional text to be included further describing the requirement statement.

The policy inspector window 900 may include a "requirement preview" field 914 that may provide a currently-created requirement statement based on the input fields as currently populated. The policy inspector window 900 may also include examples 916 to provide sample requirement statements to convey some typical requirement statement formats that may be useful in creating a particular requirement statement through the policy inspector window 900.

The policy inspector window 900 may also include a virtual create button 918 that, when selected, may generate the requirement statement based on content of the various input fields. The requirement statement generated may be viewed in the organization table 126 using similar format as that described regarding the capabilities and functions. Selection of a definition in the organization table 126 may allow the action constraint to be edited. Selection of a virtual clear button 920 may clear the various input fields.

The IRMS 100 may also allow a system to be described through a use case, which may provide a user perspective regarding use of the system. The requirement type selection window 402 may allow selection of "new use case," "new use case step," and "new alternate flow" in the requirement selection window 402. Selection of "new use case" may provide a "use case summary inspector" window shown in FIGS. 10A and 10B. The new use case inspector window 1000 may allow creation of a new use case. The new use case inspector window 1000 may include a "use case name" textual input filed 1002. The field 1002 may allow textual data used to identify a particular use case being created. The new use case inspector window 1000 may also include a "description" textual input field 1004 that may allow textual input to be input generally describing the particular use case. The new use case inspector window 1000 may also include an "actors" drop-down input field 1006. The IRMS 100 may populate the field 1006 based on available choices in the glossaries 128. The new use case inspector window 1000 may include examples 1007 providing example input for the available fields. A virtual creation button 1008 may allow the use case to be created upon selection and a virtual clear button 1010 may clear input fields upon selection. Upon creation of the use case, a use case summary table 1014 may be generated by the IRMS 100 indicating various use case input fields and any current input included in the fields. Selection of the "additional details" virtual button 1012 may allow other fields 1016 to be visible in the new use case inspector window 1000 to receive input. Radio buttons 1016 may allow the IRMS to move to the next use case, alternate flow, or use case step upon completion of manipulation through the use case inspector window 1000.

Selection of the "new use case step flow" may allow generation of a "use case step inspector" window 1100. The use case step inspector window 1100 may allow a particular step in a use case to be created. The use case step inspector window 1100 may include a "use case" drop-down input field 1102 that may allow a created use case to be selected to which the step being created is associated. The use case step inspector window 1100 may also include a "flow" drop-down input field 1104 that may allow selection of the "main flow" or "alternate flow." The main flow may be considered the primary desired operation of the particular system aspects being described by the use case, while the alternate flow may describe a secondary path based on different undesired conditions.

The use case step inspector window 1100 may include various input fields to allow a particular step to be described. The use case step inspector window 1100 may include an "actor" drop-down input field 1106 that may be populated by the actors input in the field 1006. An "action" drop-down input field 1108 and "entity acted upon" drop-down input filed 1110 may be populated by the IRMS 100 with choices from the glossaries 128. The use case step inspector window 1100 may include a "rest of sentence" textual input field 1112 that may receive textual input further describing the step.

The use case step inspector window 1100 may include examples 1114 providing example steps forming an example flow. The use case step inspector window 1100 may include a "step preview" field 1116 automatically and dynamically providing a preview of the step being generated through the use case step inspector window 1100. A virtual create button 1118 may allow creation of the step upon selection and a virtual clear button 1020 may allow input fields to be cleared upon selection. Creation of the step may be indicated in the use case summary table 1014 in a manner shown in FIGS. 11A and 11B.

Selection of the "new alternate flow" may allow generation of a "use case flow inspector" window 1200 shown in FIG. 12. The use case flow inspector window 1200 allows steps regarding an alternate flow to be generated, such as in a case when a system receives invalid input. The use case flow inspector window 1200 may include a "use case" drop-down input field 1202 and a "use case step" drop-down field 1204 that may be populated with choices of previously-created use cases and use case steps, respectively. The use case flow inspector window 1200 may also include a "flow name" textual input field 1206 allowing the particular alternate flow to be named. The use case flow inspector window 1200 may also include a "flow scenario" field 1208 allowing description of the particular scenario causing the alternate flow to be implemented. The use case flow inspector window 1200 may include a "post condition" textual input field 1210 that may be used to describe an event occurring in response to the scenario described in the field 1208.

The use case flow inspector window 1200 may include examples 1212 providing example forming an example alternate flow. The use case flow inspector window 1200 may include a virtual create button 1214 that may allow creation of the step upon selection and a virtual clear button 1216 may allow input fields to be cleared upon selection. Creation of the alternate flow may be indicated in the use case summary table 1014 in a manner shown in FIGS. 12A and 12B.

Figure 13:
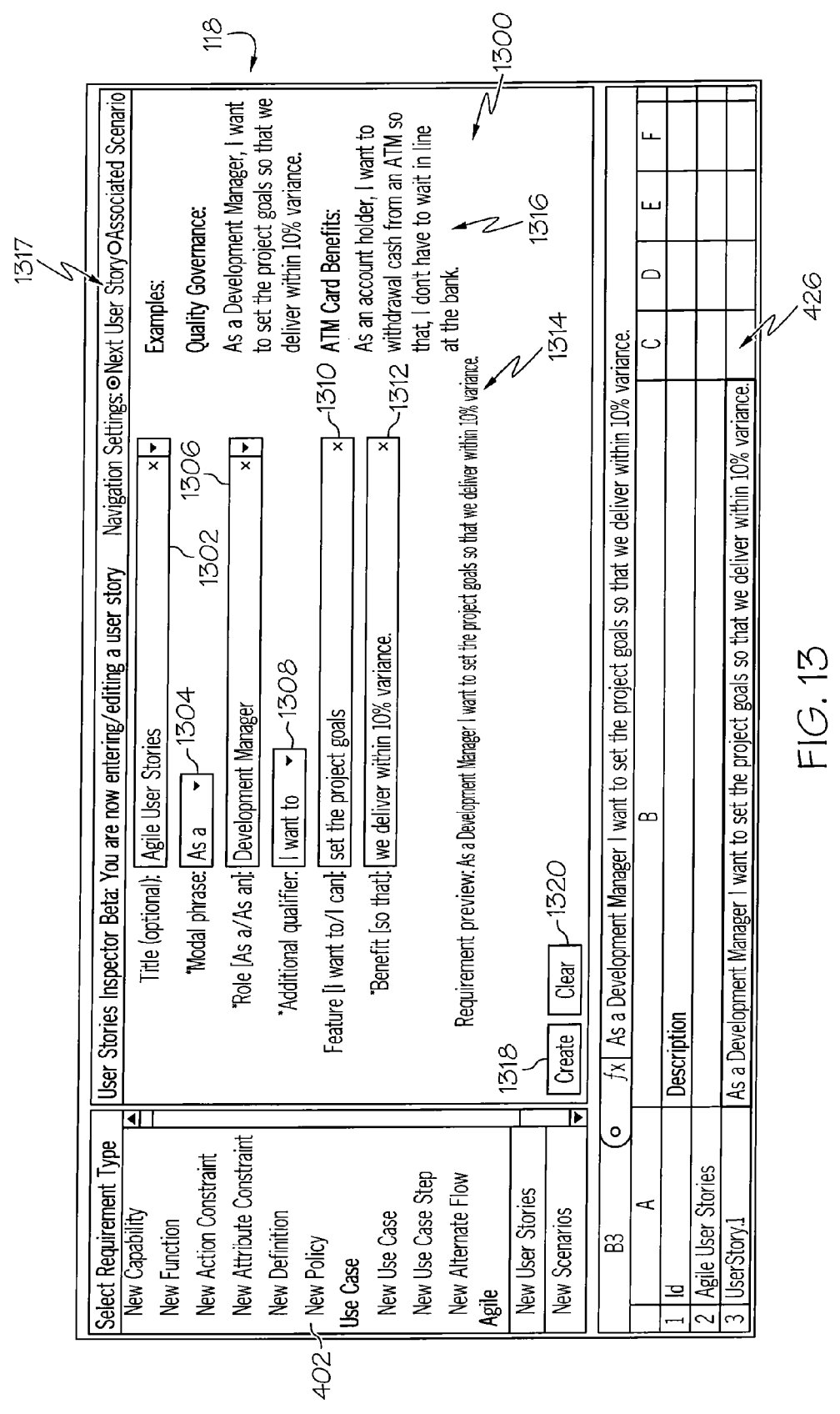

In one example, the IRMS 100 may incorporate various software development methodologies in order to provide other manners of generating requirement statements. For example, the IRMS 100 may implement "user stories" and "scenarios" associated with agile software development. Implementation of the user stories and scenarios allows creation of requirements statements to be based on common language syntax that may not necessarily follow desired requirement statement formats. The requirement selection window 402 may include a "new user stories" and a "new scenarios" selection, which may correspond to the OMIM. Selection of "new user stories" may trigger the IRMS 100 to generate a "user stories inspector" window 1300 as shown in the example of FIG. 13.

The user stories inspector window 1300 may include various input fields allowing a requirement statement to be generated in the context of a user viewpoint. For example, the input fields may include a "title" textual input field 1302 allowing a title for the particular user story to be provided. The user stories inspector window 1300 may include a "modal phrase" drop-down input field 1304 similar to that in the capability inspector window 406. A "role as a/as an" drop-down input field 1306 may be allow selection of the a particular entity. The field 1306 may be populated by the IRMS 100 using relevant entities stored in the glossaries 128.

An "additional qualifier" drop-down input field 1308 may be used to selectively provide additional language describing the particular user story. A "feature I want to/I can" textual input field 1310 may receive textual input providing a particular feature of the requirement statement being created through the user stories inspector window 1300. A "benefit [so that]" textual input field 1312 may receive textual input describing a particular benefit of the feature of the field 1310.

The user stories inspector window 1300 may include a "requirement preview" field 1314 that may provide a currently-created requirement statement based on the input fields as currently populated. The user stories inspector window 1300 may also include examples 1316 to provide sample requirement statements to convey some typical requirement statement formats that may be useful in creating a particular requirement statement through the user stories inspector window 1300. The user stories inspector window 1300 may also include radio buttons 1317 that allow another user story and associated scenario to be created upon creation of the user story.

The user stories inspector window 1300 may also include a virtual create button 1318 that, when selected, may generate the requirement statement based on content of the various input fields. The requirement statement generated may be viewed in the organization table 126 using similar format as that described regarding the capabilities and functions. Selection of a user story in the organization table 126 may allow the selected user story to be edited. Selection of a virtual clear button 1320 may clear the various input fields.

Figure 14:
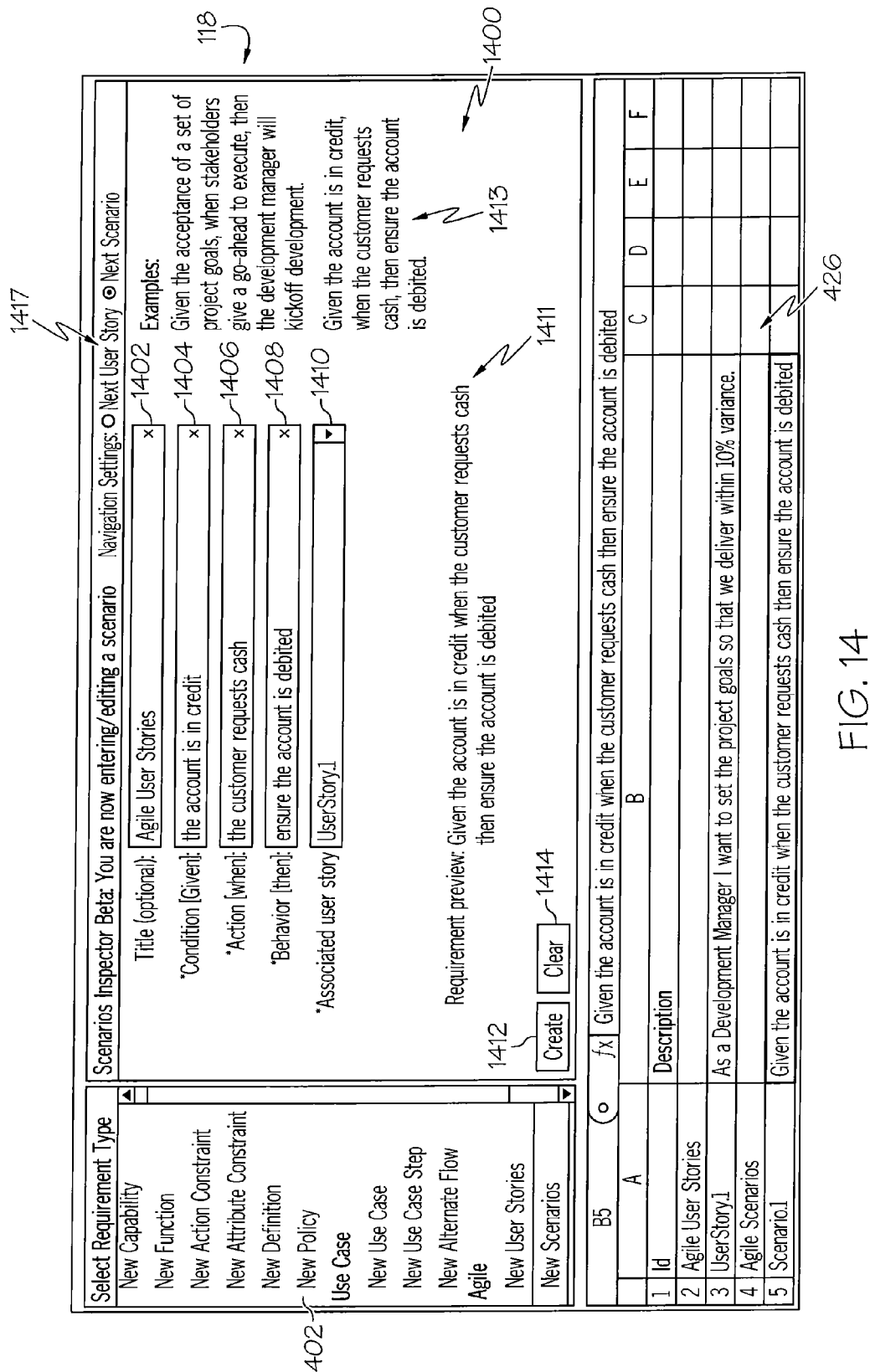
FIG. 14 is an example of a scenarios inspector window of the interactive visual environment of FIG. 4.

Selection of "new scenarios" in the may trigger the IRMS 100 to generate a "scenarios inspector" window 1400 as shown in the example of FIG. 14. The scenario inspector window 1400 may allow a requirement statement to be created from a scenario perspective. In one example, the scenarios inspector window 1400 may include a "title" textual input field 1402 to receive textual input to entitle a particular scenario. The scenario inspector window 1400 may also include a "condition" textual input field 1404 to receive textual input describing a particular condition of the scenario.

An "action" textual input field 1406 may receive textual input describing a particular condition occurring under a scenario. A "behavior" textual input field 1408 may receive input describing a particular behavior resulting from the action described in the field 1406. An "associated user story" drop-down field 1410 may allow a particular scenario to be associated with a preexisting user story, such as that created through the user stories inspector window 1300. A "requirement preview" field 1411 that may provide a currently-created requirement statement based on the input fields as currently populated. The user stories scenario inspector window 1400 may also include examples 1413 to provide sample requirement statements to convey some typical requirement statement formats that may be useful in creating a particular requirement statement through the scenario inspector window 1400.

The scenario inspector window 1400 may also include a virtual create button 1412 that, when selected, may generate the requirement statement based on content of the various input fields. The requirement statement generated may be viewed in the organization table 126 using similar format as that described regarding the capabilities and functions. Selection of a user story in the organization table 126 may allow the selected scenario to be edited. Selection of a virtual clear button 1414 may clear the various input fields. The scenario inspector window 1400 may include radio buttons 1416 that allow either a new user story or another scenario to be created upon creation of a new scenario.

Figure 15:
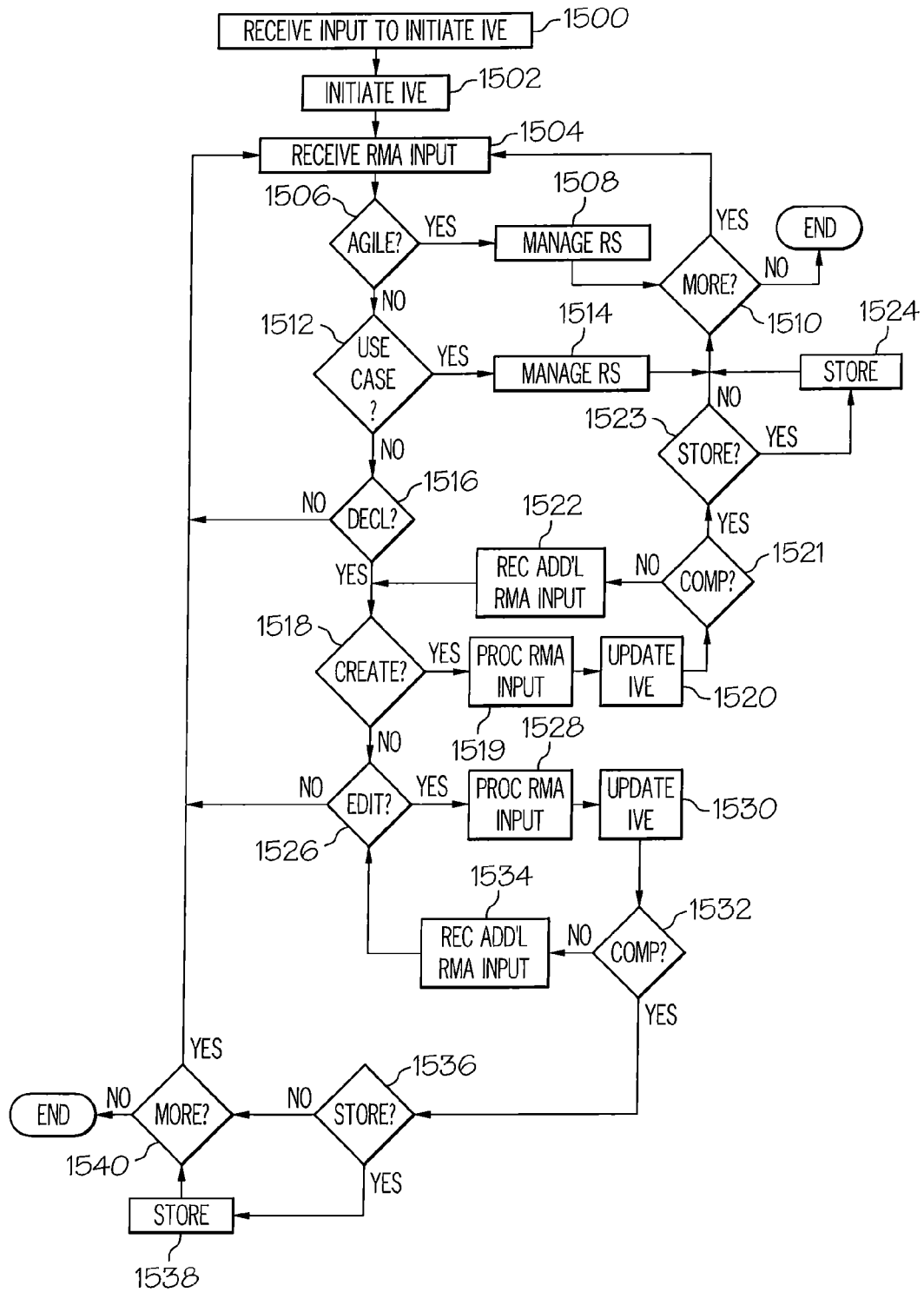
FIG. 15 is an example operational flow diagram of an interactive requirement manipulation system.

FIG. 15 is an operational flow diagram of the IRMS 100. The IRMS 100 may receive input via the GUI 107 to initiate the interactive visual environment (IVE) 118 (block 1500). The IRMS 100 may initiate the interactive visual environment 118 (block 1502). In one example, the interactive visual environment 118 may be initiated into a specific requirement manipulation mode. In alternative examples, the interactive visual environment 118 may be initiated into a non-specific requirement manipulation mode.

The IRMS 100 may receive a RMA input 200 (block 1504). The RMM 100 may determine if the received RMA input 200 associated with generation of a requirement statement using agile-based considerations (block 1506), such as that described with regard to FIGS. 13 and 14. If the received RMA input 200 is associated with agile-based considerations, a requirement statement (RS) may be manipulated (block 1508) for creation of the requirement statement, as described with regard to FIGS. 13 and 14, which may also include the option to store an agile-based requirement statement. Upon manipulation of the requirement statement, the IRMS 100 may determine if further requirement manipulation is desired (block 1510). If further requirement statement manipulation is desired, additional RMA input 200 may be received.

If the received RMA input 200 is determined to not be associated with agile-based consideration, the IRMS 100 may determine if the RMA input 200 is associated with a use case (block 1512). If the RMA input 200 is associated with a use case, the IRMS 100 may manipulate a requirement statement (block 1514) through a manner such as that described with regard to FIGS. 10A-12B, which may include an option to store the use-case based requirement statement. Upon manipulation of the requirement statement, the IRMS 100 may determine if further requirement manipulation is desired. If further requirement statement manipulation is desired, additional RMA input 200 may be received. If the RMA input 200 is determined to not be associated with a use case, the IRMS 100 may determine if the RMA input 200 is associated with a declarative-based requirement statement (block 1516). If the RMA input 200 is not associated with a declarative-based requirement, the IRMS 100 may receive another RMA input 200, such as when the prior RMA input 200 is invalid.

If the RMA input is determined to be associated with a declarative-based requirement type, the IRMS 100 may determine if a requirement statement is to be created (block 1518). If a declarative requirement statement is to be created, the IRMS 100 may appropriately process the RMA input 200 (block 1519). The IRMS 100 may update the interactive visual environment to indicate that appropriate processing (block 1520). Upon updating the interactive visual display, the IRMS 100 may determine if enough information for creation of the requirement statement has been received (block 1521). If enough information has not been received, the IRMS 100 may receive additional RMA input 200 (block 1522) as supplied via the GUI 107. Upon creation of the requirement statement, the IRMS 100 may determine if that requirement statement is to be stored (block 1523). If the requirement statement is to be stored, the IRMS 100 may store the requirement statement, such as in the RDS 126. Upon storing, or if no storing is desired, the IRMS 100 may receive another RMA input 200.

If creation of a declarative-based requirement statement is not desired, the IRMS may determine if editing of a predetermined requirement statement is requested (block 1526). If a declarative requirement statement is to be edited, the IRMS 100 may appropriately process the RMA input 200 (block 1528). The IRMS 100 may update the interactive visual environment to indicate that appropriate processing (block 1530). Upon updating the interactive visual display, the IRMS 100 may determine if enough information for editing the requirement statement has been received (block 1532). If enough information has not been received, the IRMS 100 may receive additional RMA input 200 (block 1534) as supplied via the GUI 107. Upon creation of the requirement statement, the IRMS 100 may determine if that requirement statement is to be stored (block 1536). If the edited requirement statement is to be stored, the IRMS 100 may store the requirement statement (block 1538), such as in the RDS 126. Upon storing, or if no storing is desired, the IRMS 100 may determine if another RMA input 200 is received (block 1540).

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

We claim:

1. A requirement statement manipulation system comprising:
   a database configured to store a requirement statement data set, wherein the requirement statement data set is configured to include a plurality of requirement statements, wherein each requirement statement describes a design aspect of a software system, and wherein each of the plurality of requirement statements corresponds to one of a plurality of predetermined requirement statement types; and
   an interactive requirement manipulation system executable by a processor to:
   receive a first input corresponding to a selection of one of the plurality of predetermined requirement statement types;
   select a requirement manipulation interface module from a plurality of requirement manipulation interface modules, the requirement manipulation interface module corresponding to the selected predetermined requirement statement type;
   generate a first display according to the requirement manipulation interface module that provides a visual interactive environment configured to include a first manipulation action for manipulation of a requirement statement of the selected predetermined requirement statement type;
   receive a second input corresponding to the first manipulation action to manipulate the requirement statement;
   perform the first manipulation action on the requirement statement in response to the second input;
   generate a second display to indicate performance of the first manipulation action on the requirement statement according to the visual interactive environment provided by the requirement manipulation interface module, and receive a third input corresponding to another selection of one of the plurality of predetermined requirement statement types that is different from the predetermined requirement statement type selected according to the first input.

2. The requirement statement manipulation system of claim 1, wherein the first manipulation action is a creation of the requirement statement.

3. The requirement statement manipulation system of claim 1, wherein the requirement statement is a pre-existing requirement statement, and wherein the first manipulation action is an edit of the requirement statement.

4. The requirement statement manipulation system claim 1, wherein the interactive requirement manipulation system is further executable to establish a hierarchical relationship between the requirement statement and a preexisting requirement statement.

5. The requirement statement manipulation system of claim 1, wherein the interactive requirement manipulation system comprises a language determination module executable by the processor to select at least one word to include in the requirement statement.

6. The requirement statement manipulation system of claim 1, wherein the interactive requirement manipulation system is further executable to import at least one requirement-statement manipulation tool to perform the requirement manipulation action.

7. A requirement statement manipulation system comprising:
   a database configured to store a requirement statement data set, wherein the requirement statement data set is configured to include a plurality of requirement statements, wherein each requirement statement describes a design aspect of a software system, and wherein each of the plurality of requirement statements corresponds to one of a plurality of predetermined requirement statement types; and
   an interactive requirement manipulation system executable by a processor, wherein the interactive requirement manipulation system comprises:
   a requirement manipulation module executable by the processor to:
      receive a first input corresponding to a selected one of the plurality of predetermined requirement statement types;
      determine the one of the plurality of predetermined requirement statement types based on the input;
      generate a first output signal configured to drive a display to provide a visual interactive environment configured to manipulate a requirement statement of the selected one of the plurality of predetermined requirement statement types;
      receive a second input indicative of a first manipulation action, wherein the first manipulation action corresponds to the requirement statement and wherein the first manipulation action comprises one of a declarative requirement statement, an agile-based requirement statement, and a use-ease-based requirement statement;
      perform the first manipulation action in response to the second input;
      generate a second output signal configured to drive the display to indicate performance of the first manipulation action through the visual interactive environment.

8. A method of operating a requirement manipulation system, the method comprising:
   receiving a first input indicative of a request to manipulate at least one requirement statement having a predetermined requirement statement type, wherein the at least one requirement statement describes a design aspect of a software system;
   selecting a requirement manipulation interface, from a plurality of requirement manipulation interfaces, the requirement manipulation interface corresponding to the predetermined requirement statement type;
   in response to receipt of the first input, generating an interactive visual environment on a display based on the requirement manipulation interface, the interactive visual environment including at least one requirement manipulation action to manipulate the at least one requirement statement, wherein the interactive visual environment is configured to provide at least one visual indication that the first input is received;
   receiving a second input indicative of a request to perform the at least one requirement manipulation action;
   performing the at least one requirement manipulation action on the at least one requirement statement in response to receiving the second input;
   updating the interactive visual environment to indicate performance of the at least one requirement manipulation action on the at least one requirement statement, and
   receiving a third input corresponding to a selection of one of a plurality of predetermined requirement statement types that is different from the predetermined requirement statement type corresponding to the first input.

9. The method of claim 8, wherein performing the at least one requirement manipulation action comprises the initial step of creating the at least one requirement statement.

10. The method of claim 9 further comprising selecting and including text in the at least one requirement statement.

11. The method of claim 8, wherein performing the at least one requirement manipulation action comprises:
   recalling the at least one requirement statement from a database; and
   editing the at least one requirement statement.

12. The method of claim 8 further comprising providing a requirement-type-specific window within the interactive visual environment.

13. The method of claim 8 further comprising generating a visual hierarchy indicating a hierarchical relationship between the requirement statement and a preexisting requirement statement.

14. A computer-readable storage medium comprising a plurality of instructions executable by a processor, the computer-readable storage medium comprising:
   instructions to receive a first input indicative of a request to manipulate at least one requirement statement of a predetermined requirement statement type, wherein the at least one requirement statement describes a design aspect of a software system;
   instructions to select a requirement manipulation interface, from a plurality of requirement manipulation interfaces, the requirement manipulation interface corresponding to the predetermined requirement statement type;
   instructions to generate an interactive visual environment on a display, based on the requirement manipulation interface, in response to the first input, wherein the interactive visual environment is configured to provide at least one visual indication that the first input is received;
   instructions to receive a second input indicative of a request to perform at least one requirement manipulation action to manipulate the at least one requirement statement;

instructions to perform the at least one requirement manipulation action on the at least one requirement statement in response to receiving the second input;

instructions to update the interactive visual environment to indicate performance of the at least one requirement manipulation action on the at least one requirement statement, and instructions to receive a third input corresponding to a selection of one of a plurality of predetermined requirement statement types that is different from the predetermined requirement statement type corresponding to the first input.

15. The computer-readable storage medium of claim 14, further comprising instructions to import at least one requirement-based tool to perform the at least one requirement manipulation action.

16. The computer-readable storage medium of claim 14, further comprising instructions to recall at least a portion of the at least one requirement statement.

17. The computer-readable storage medium of claim 14, wherein the instructions to perform the at least one requirement manipulation action comprise instructions to create or edit the at least one requirement statement.

18. The computer-readable storage medium of claim 14, wherein the instructions to generate an interactive visual environment on a display comprise instructions to generate a user-perspective environment in the interactive visual environment.

19. The computer-readable storage medium of claim 14, wherein the instructions to generate an interactive visual environment on a display comprise instructions to generate a scenario-based environment in the interactive visual environment.

* * * * *